United States Patent
Allen et al.

(10) Patent No.: US 10,698,823 B2
(45) Date of Patent: Jun. 30, 2020

(54) METHOD AND APPARATUS FOR USING CACHE SIZE ESTIMATIONS FOR GUIDING HOT-TIER INSERTION DECISIONS

(71) Applicant: Nutanix, Inc., San Jose, CA (US)

(72) Inventors: Cyril Anthony Allen, Seattle, WA (US); Aman Nijhawan, Seattle, WA (US); Peter Scott Wyckoff, Durham, NC (US); Rickard Edward Faith, Hillsborough, NC (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/965,721

(22) Filed: Apr. 27, 2018

(65) Prior Publication Data
US 2019/0332536 A1 Oct. 31, 2019

(51) Int. Cl.
G06F 12/0811 (2016.01)

(52) U.S. Cl.
CPC .. *G06F 12/0811* (2013.01); *G06F 2212/1021* (2013.01); *G06F 2212/1024* (2013.01); *G06F 2212/152* (2013.01); *G06F 2212/608* (2013.01)

(58) Field of Classification Search
CPC ......... G06F 12/0811; G06F 2212/1021; G06F 2212/1024; G06F 2212/152; G06F 2212/608
See application file for complete search history.

(56) References Cited

U.S. PATENT DOCUMENTS 4,882,642 A * 11/1989 Tayler ................. G06F 12/0866
360/78.11
8,549,518 B1 10/2013 Aron et al.
8,601,473 B1 12/2013 Aron et al.
(Continued)

FOREIGN PATENT DOCUMENTS

EP 2378410 A2 10/2011
WO WO 2010099992 A1 9/2010

OTHER PUBLICATIONS

Notice of Allowance dated Jun. 14, 2018 for related U.S. Appl. No. 15/169,381.
(Continued)

*Primary Examiner* — David Yi
*Assistant Examiner* — Dustin B. Fulford
(74) *Attorney, Agent, or Firm* — Vista IP Law Group, LLP

(57) ABSTRACT

A method and apparatus for using cache size estimations for guiding hot-tier insertion decisions. The method and apparatus include an adaptive management element that determines what accesses of a resource should be logged and the parameters for logging. The determinations are used to configure an adaptive logging element to log only accesses corresponding to the selected resource(s) and to log only those accesses that match the identified parameters. The adaptive management element operates in a feedback loop: first determining what will be logged and second implementing that determination by an adaptive logging element. Upon a triggering event, the process returns to the first determination based on any then current parameters. In some embodiments, the parameters include a size estimate to achieve a given target hit rate (target hit rate size estimate) that is used in generating a score or weighting to identify the highest/best scoring/weighted disk(s) for logging.

25 Claims, 17 Drawing Sheets

(56) References Cited

U.S. PATENT DOCUMENTS

| | | |
|---|---|---|
| 8,850,130 B1 | 9/2014 | Aron et al. |
| 8,997,097 B1 | 3/2015 | Aron et al. |
| 9,052,936 B1 | 6/2015 | Aron et al. |
| 9,256,374 B1 | 2/2016 | Aron et al. |
| 9,256,475 B1 | 2/2016 | Aron et al. |
| 9,354,912 B1 | 5/2016 | Aron et al. |
| 9,389,887 B1 | 7/2016 | Aron et al. |
| 9,471,243 B2 | 10/2016 | Kumar et al. |
| 9,575,784 B1 | 2/2017 | Aron et al. |
| 9,619,257 B1 | 4/2017 | Aron et al. |
| 9,772,866 B1 | 9/2017 | Aron et al. |
| 9,959,279 B2 | 5/2018 | Archak et al. |
| 10,114,751 B1 | 10/2018 | Faith et al. |
| 2009/0138883 A1* | 5/2009 | McLean .................... G06F 9/50 718/104 |
| 2013/0138889 A1 | 5/2013 | Chockler et al. |
| 2014/0281249 A1 | 9/2014 | Waldspurger et al. |
| 2015/0248402 A1 | 9/2015 | Patterson, III et al. |
| 2016/0140052 A1* | 5/2016 | Waldspurger ....... G06F 12/0893 711/129 |
| 2017/0046091 A1 | 2/2017 | Antony et al. |
| 2017/0060769 A1 | 3/2017 | Wires et al. |
| 2017/0235590 A1 | 8/2017 | Sinha et al. |

OTHER PUBLICATIONS

Mattson, R. L., Gecsei, J., Slutz, D. R., Traiger, I. L., "Evaluation techniques for storage hierarchies", IBM Systems Journal 9(2):78-117, 1970, 40 pages.
Non-Final Office Action dated Feb. 8, 2018 for related U.S. Appl. No. 15/169,381.
U.S. Appl. No. 15/169,381, filed May 31, 2016, 74 pages.
IBM Corporation, "IBM Storwize V7000 Gen2 Easy Tier with Microsoft Hyper-V, SQL, and Exchange", Jul. 2015. retrieved from https://www01.ibm.com/support/docview.wss?uid=tss1wp102548&aid=1.
Tai, J. et al, "Improving Flash Resource Utilization at Minimal Management Cost in Virtualized Flash-based Storage Systems", *IEEE Transactions on Cloud Computing* 5(99):1-1, Jan. 2015. retrieved from http://nucsrl.coe.neu.edu/sites/nucsrl.coe.neu.edu/files/Papers/VFRM-J-REVISED2.pdf.
NEC Corportion, "VMware vSphere Virtual Volumes Changes the Virtualization Environment", Jun. 2015. retrieved from https://www.nec.com/en/global/prod/storage/file/pdf/WP_VVOL.pdf.
Caradonna, J. et al, "NetApp Data Fabric Architecture Fundamentals", NetApp, Inc., Mar. 2017. retrieved from https://cloud.netapp.com/hubfs/Data-Fabric/Data%20Fabric%20WP%20April%202017.pdf.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Buragohain, C., et al. (2009) Quantiles on Streams. In: Liu L., Özsu M.T. (eds) Encyclopedia of Database Systems. Springer, Boston, MA. 5 pages.
Arasu, A. et al. Approximate counts and quantiles over sliding windows. In *Proc. of the PODS '04*, Jun. 2004.
Blum, M. et al. Time bounds for selection. *Journal of Computer and System Sciences*, 7:448-461, Aug. 1973.
Cormode, G. et al. Holistic UDAFs at streaming speeds. In *Proc. of ACM SIGMOD*, Jun. 2004.
Cormode, G. et al. Space- and time-efficient deterministic algorithms for biased quantiles over data streams. In *Proc. of PODS'06*. Jun. 26-28, 2006.
Cormode, G. et al. An improved data stream summary: The count-min sketch and its applications. *Journal of Algorithms*, 55(1):58-75, Apr. 2005.
Cormode, G. et al. What's different: Distributed, continuous monitoring of duplicate-resilient aggregates on data streams. In *Proc. of the 22nd International Conference on Data Engineering*, Apr. 2006.
Cranor, C. et al. Gigascope: A stream database for network applications. *In Proc. of the ACM SIGMOD*, 3, Jun. 9-1, 2003.
Flajolet, P. et al. Probabilistic counting algorithms for data base applications. *Journal of Computer and System Sciences*, 31(2):182-209, Oct. 1985.
Greenwald, M. et al. Space-efficient online computation of quantile summaries. In *Proc. the 20th ACM SIGMOD Intl. Conf. on Management of Data (SIGMOD)*, May 2001.
Greenwald, M. et al. Power-conserving computation of order-statistics over sensor networks. In *Proc. of 23rd ACM Symposium on Principles of Database Systems (PODS)*, Jun. 2004.
Gupta, A. et al. Counting inversions in lists. In *Proc. of the 14th Annual ACM-SIAM Symp. on Discrete Algorithms*, Jan. 2003.
Lin, X. et al. Continuously maintaining quantile summaries of the most recent n elements over a data stream. In *Proceedings of the 20th International Conference on Data Engineering (ICDE'04)*, Apr. 2004.
Manku, G. S. et al. Approximate medians and other quantiles in one pass and with limited memory. In *Proc. of ACM SIGMOD '98*, pp. 426-435, Jun. 1998. ACM Press.
Manku, G. S. et al. Random sampling techniques for space efficient online computation of order statistics of large datasets. In *Proc. of ACM SIGMOD '99*, pp. 251-262, Jun. 1999. ACM Press.
Munro, J. I. et al. Selection and sorting with limited storage. *Theoretical Computer Science*, pp. 315-323, Revised Mar. 1980.
Paterson, M. S. Progress in selection. In *Scandinavian Workshop on Algorithm Theory*, pp. 368-379, Apr. 1996.
Pike, R. Interpreting the data: Parallel analysis with sawzall. *Scientific Programming Journal*, 13(4):227-298, Dec. 2005.
Shrivastava, N. Medians and beyond: New aggregation techniques for sensor networks. In *Proc. of SenSys '04*, Nov. 2004.
Vitter, J. S. Random sampling with a reservoir. *ACM Transactions on Mathematical Software*, 11(1), Mar. 1985.
Cano, I. et al., "Curator: Self-managing storage for enterprise clusters", *14th USENIX Symposium on Networked Systems Design and Implementation, NSDI '17*, (Mar. 27, 2017).
Buragohain C. et al. Quantiles on streams. In: Liu L., Özsu M.T. (eds) *Encyclopedia of Database Systems*, Jan. 2009.

\* cited by examiner

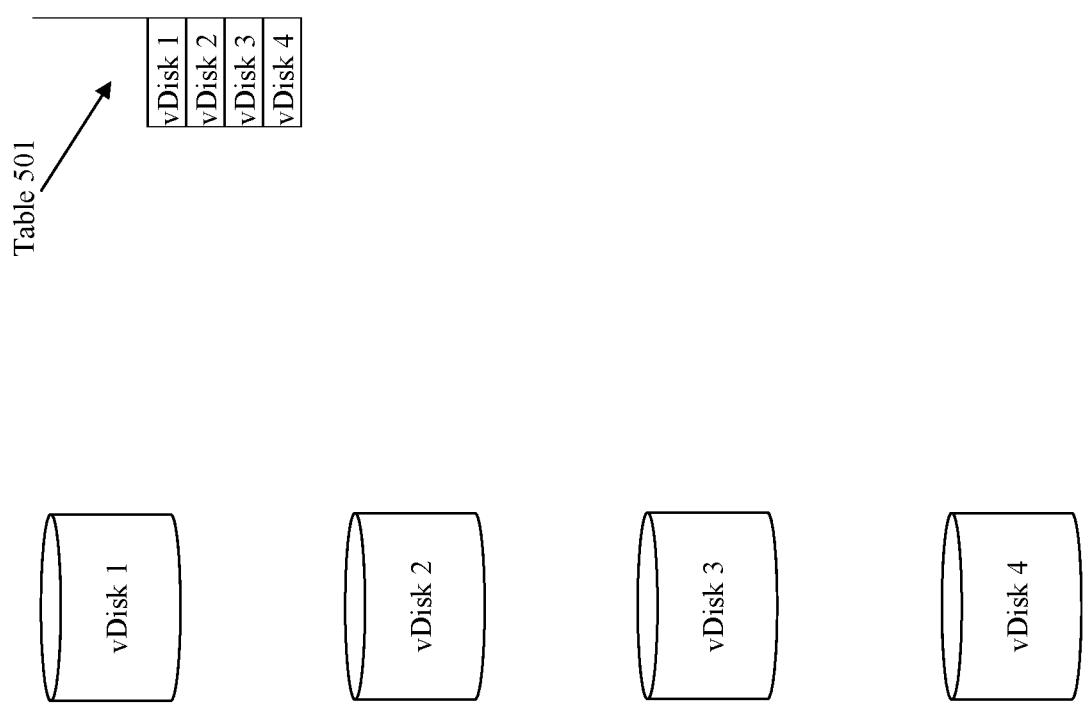

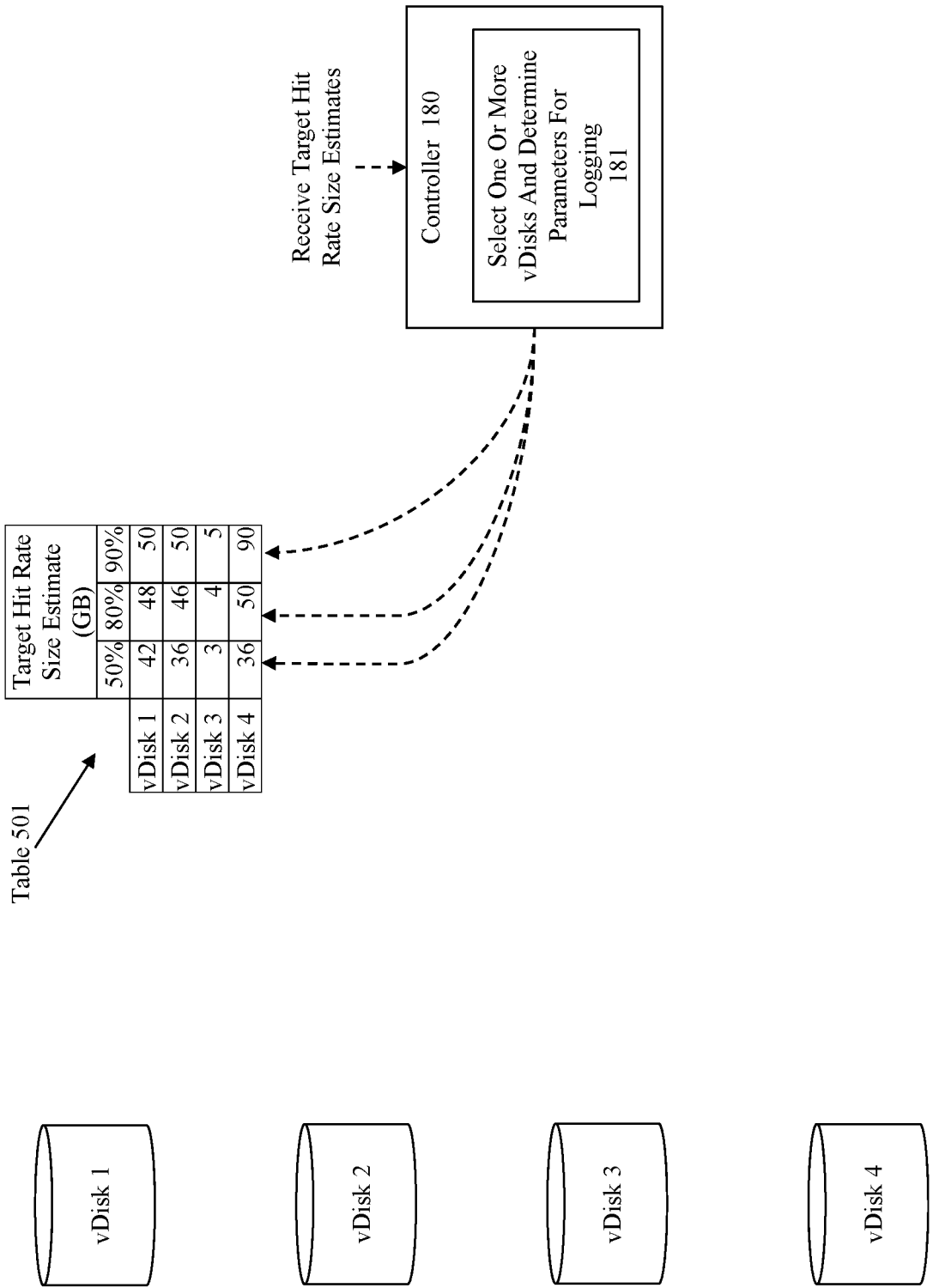

Table 501

| | Target Hit Rate Size Estimate (GB) | | | vDisk Size (GB) | Current Hit Rate (%) | Incremental Target Hit Rate Size Estimate (GB/%) | Normalized vDisk Weights |
|---|---|---|---|---|---|---|---|
| | 50% | 80% | 90% | | | | |
| vDisk 1 | 42 | 48 | 50 | 100 | 42 | (42-0)/(50-0)=.84 | 100/.84=119 |
| vDisk 2 | 36 | 46 | 50 | 100 | 75 | (46-36)/(80-50)=.33 | 100/.33=303 |
| vDisk 3 | 3 | 4 | 5 | 10 | 85 | (5-4)/(90-80)=.10 | 10/.1=100 |
| vDisk 4 | 36 | 50 | 90 | 200 | 72 | (50-36)/(80-50)=.46 | 200/.46=434 |

Controller 180

Select One Or More vDisks And Determine Parameters For Logging 181

Computed Size Normalized Weights

METHOD AND APPARATUS FOR USING CACHE SIZE ESTIMATIONS FOR GUIDING HOT-TIER INSERTION DECISIONS

FIELD

This disclosure concerns a method and apparatus for using cache size estimations for guiding hot-tier insertion decisions.

BACKGROUND

Current methods for guiding hot-tier insertion decisions rely on global rules for collection of access information and ultimately for determining what data should be inserted into a hot-tier.

However, the current methods suffer from drawbacks including an inability to efficiently cope with a large amount of accesses to be logged. Specifically, the global rules require that either the number of accesses logged be reduced to stop or limit the amount of memory used for logging or allow the logging process to consume an ever-growing amount of memory. In the first instance, the quality of the logging will decrease and thus data promoted to a higher tier will be less likely to result in a hit rate increase. In the second instance, the amount of memory used may grow so large as to cause a noticeable decrease in performance for the system.

Therefore, what is needed is an improved method for guiding hot-tier insertion decisions.

SUMMARY

The present disclosure concerns a method and apparatus for using cache size estimations for guiding hot-tier insertion decisions. Generally, the method and apparatus include an adaptive management element that makes determinations as to what accesses of a resource should be logged and the parameters for that logging. Furthermore, the determinations of the controller are used to configure an adaptive logging element to log only accesses corresponding to the selected resource(s) and only those accesses that match the identified parameters. Additionally, the adaptive management element operates in a feedback loop where first a determination is made by a controller element as to what will be logged, and second the determination is implemented by an adaptive logging element. Then upon an occurrence of a triggering event, the process returns to the first determination based on any current parameters. In some embodiments, the parameters include a target hit rate size estimate that is used in generating a score or weighting to identify the highest/best scoring/weighted vDisk(s) for logging.

Further details of aspects, objects, and advantages of the disclosure are described below in the detailed description, drawings, and claims. Both the foregoing general description and the following detailed description are illustrative and explanatory and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 5A-H illustrate the operation of a system according to some embodiments.

DETAILED DESCRIPTION OF THE EMBODIMENTS OF THE INVENTION

The present disclosure concerns a method and apparatus for using cache size estimations for guiding hot-tier insertion decisions.

Various embodiments are described hereinafter with reference to the figures. It should be noted that the figures are not necessarily drawn to scale. It should also be noted that the figures are only intended to facilitate the description of the embodiments and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material or characteristic described in connection with the embodiments is included in at least one embodiment. Thus, the appearances of the phrase "in some embodiments" or "in other embodiments", in various places throughout this specification are not necessarily referring to the same embodiment.

In some embodiments, the process includes an adaptive management element including a controller for making determinations as to what particular resource should be logged and what the parameters of should be for logging. For instance, this application will discuss operation of the controller in the context of a plurality of vDisks corresponding to data on multiple tiers of a storage element where a determination is made as to which accesses corresponding to vDisks of the plurality of vDisks should be logged.

In some embodiments, the results of the determinations by the controller are used to configure an adaptive logging element to log only accesses corresponding to the selected resource(s) but only those that match the identified parameters. For example, this application will discuss logging in the context of the above mentioned vDisks, where the adaptive logging element logs only accesses corresponding to the above identified vDisks.

In some embodiments, the adaptive management element operates in a loop where first a determination is made by a controller element as to what is to be logged, second the determination is implemented by an adaptive logging element, and upon occurrence of a triggering event various updated parameters are evaluated/reevaluated by the controller element. In some embodiments, the parameters include a target hit rate size estimate that is used in generating a score or weighting to identify the highest/best scoring/weighted vDisk(s) for logging.

Figure 1A:
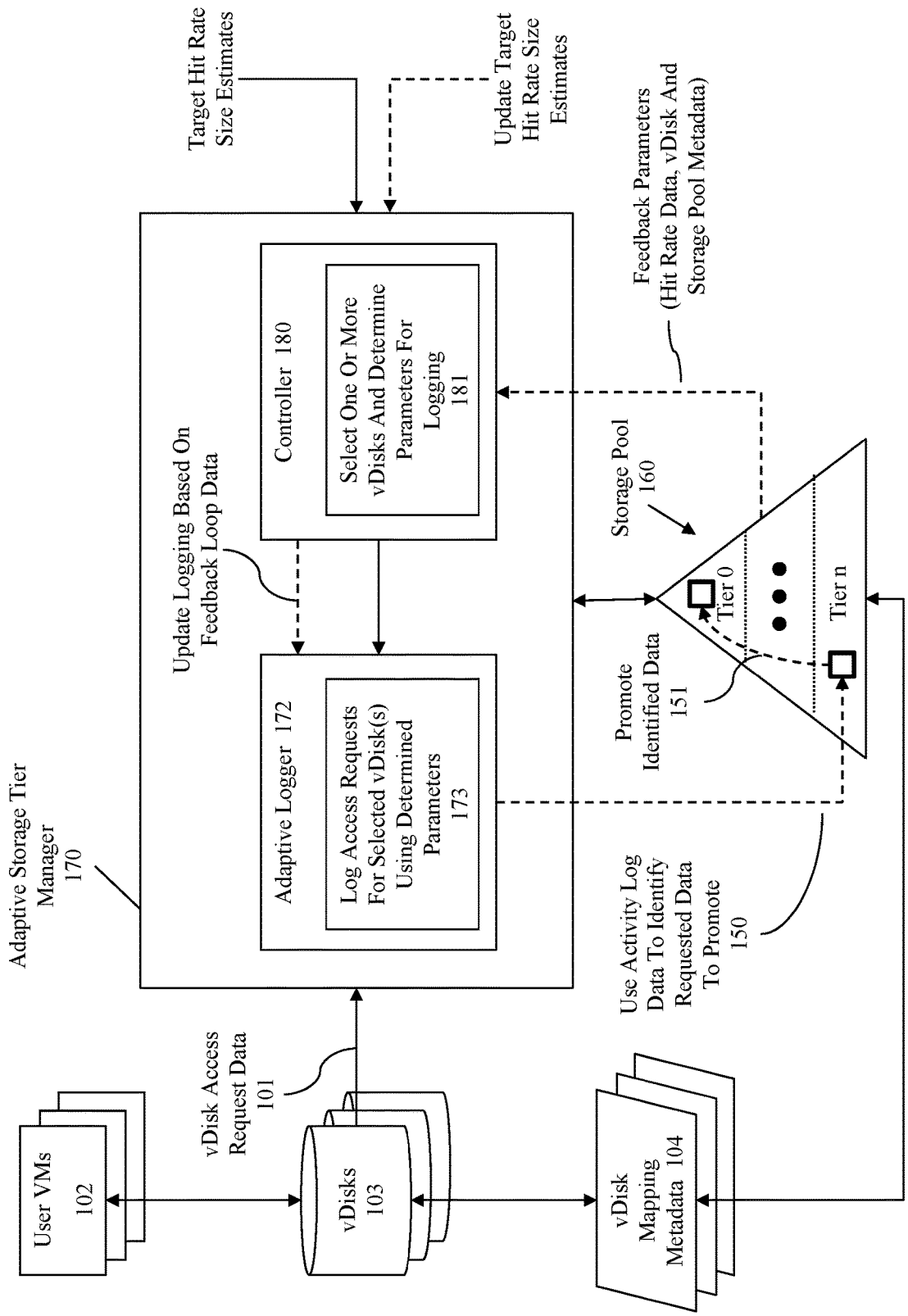
FIG. 1A-C illustrate an approach and environments for using cache size estimations to guiding hot-tier insertion decisions.
Figure 1B:
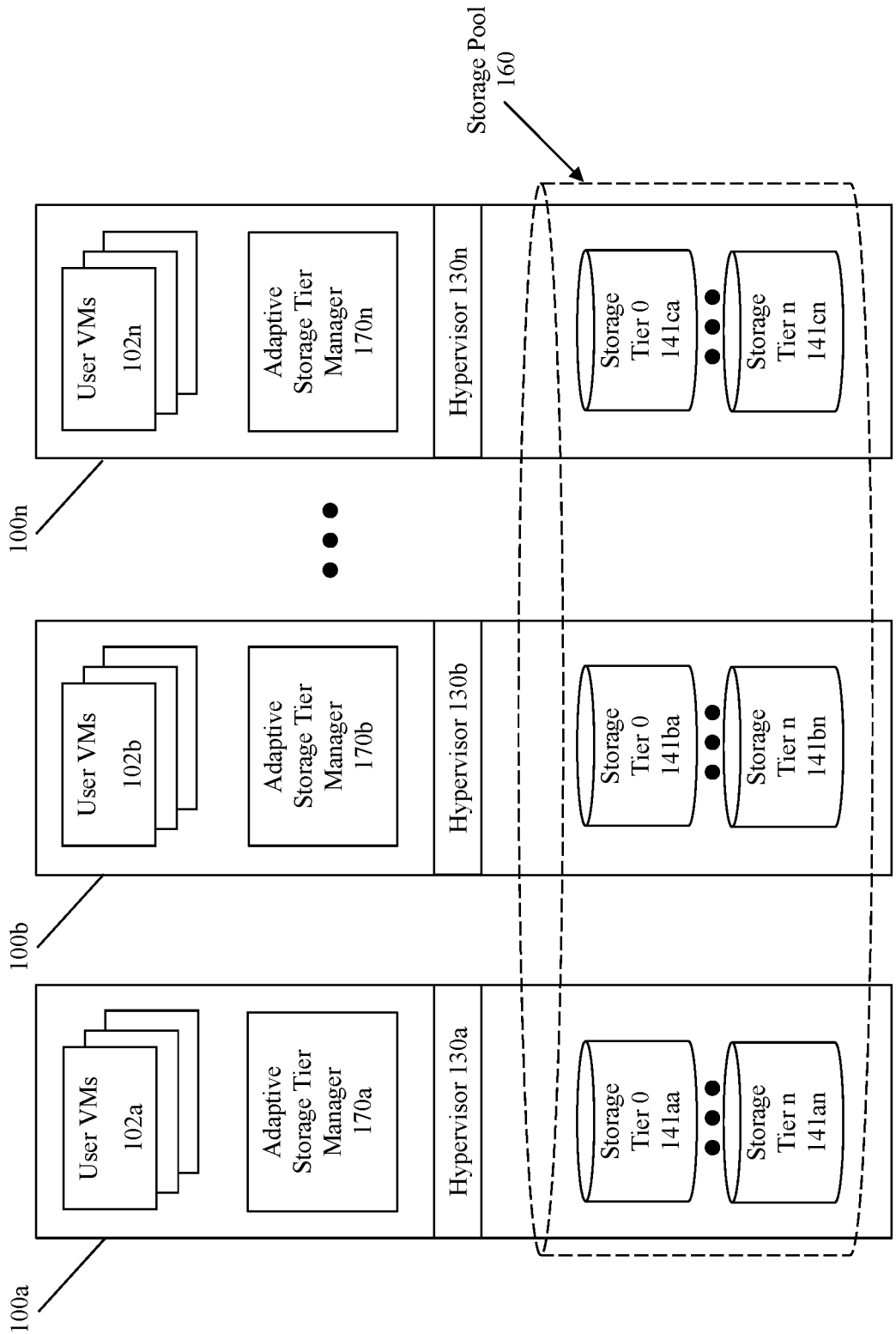
Figure 1C:
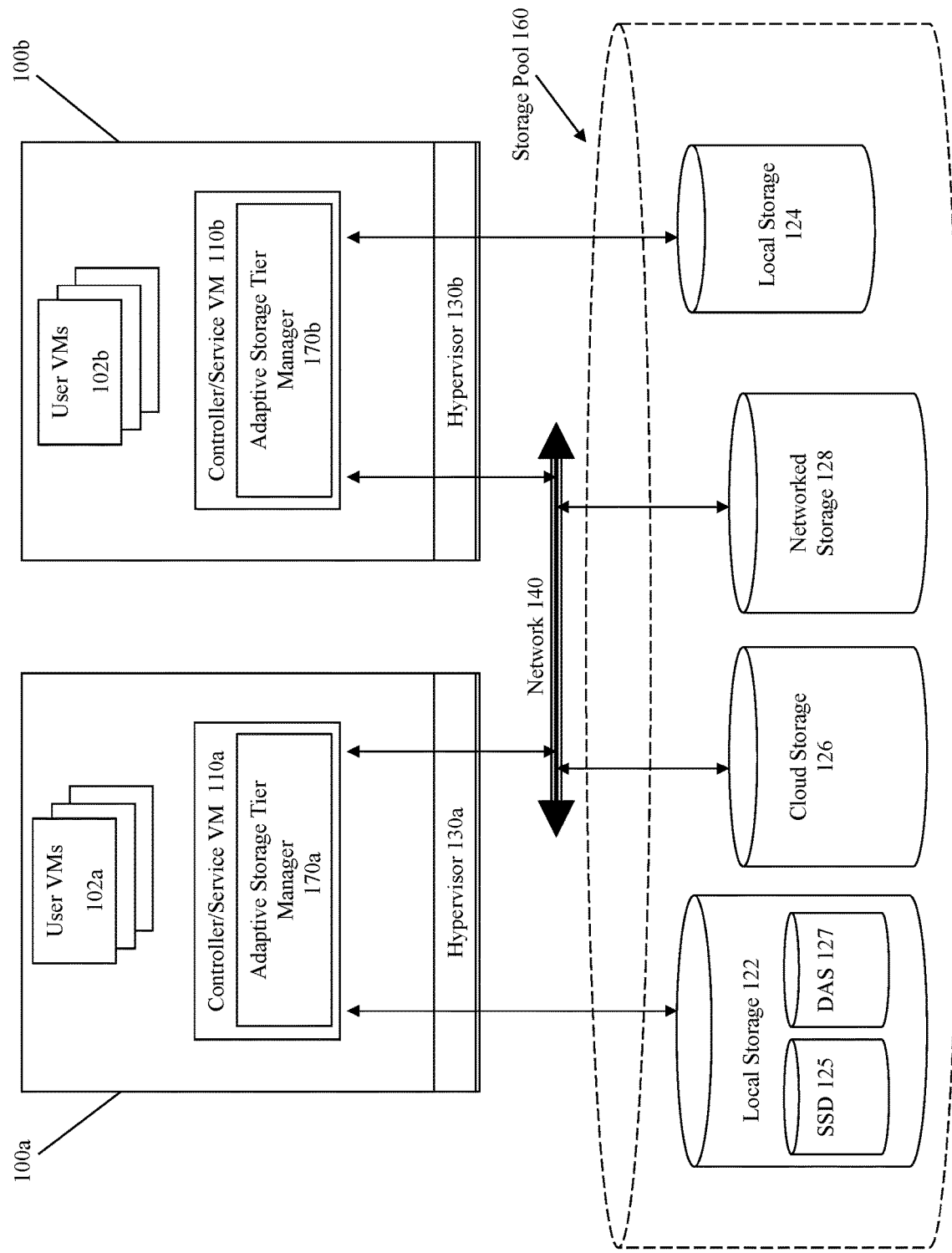

FIG. 1A-C illustrate an approach and environments for using cache size estimations to guiding hot-tier insertion decisions.

The illustration of FIG. 1A includes an adaptive storage tier manager that receives vDisk access request data, various parameters pertaining to those accesses, and estimation information corresponding to estimates of amounts of data that would need to be placed in a hot-tier to achieve a specified target hit rate. FIG. 1A is illustrative of an embodiment for the purposes of explaining the disclosed invention, however other embodiments may be used within the scope and spirit of this disclosure.

A storage pool 160 having multiple tiers is provided for storing data from at least virtual disks (vDisks) 103. Respective vDisks of a plurality of vDisks correspond to one or more user virtual machines (VMs) 102 and are managed using mapping metadata 104. Details of how the storage pool 160, vDisks 103, and user VMs 102 are implemented using the vDisk mapping metadata 104 is discussed further in regard to subsequent figures. However, for purposes of the discussion of FIG. 1A the storage pool 160 comprises a logical collection of storage devices (e.g. two or more storage devices) treated as a group, where the data of respective vDisks are distributed across the storage pool as indicated by the vDisk mapping metadata 104. Furthermore, each user VM of user VMs 102 may be associated with one or more vDisks, of vDisks 103, and the vDisks are owned by a particular VM and may be shared with other VMs. The storage pool 160 is divided into multiple tiers where data can be promoted into a hot-tier (e.g. tier 0) when the data is predicted to be accessed more frequently than other data. For instance, some identified data 151 may be promoted from tier n to tier 0 because of a pattern of access or series of accesses. In some embodiments, the storage pool may be constructed of spinning hard disk drives (HDDs) and of Solid state drives (SSDs), where the Tier 0 corresponds to the SSDs and some lower tier (e.g. tier n) corresponds to the HDDs. Thus, promoting the data from a lower tier (e.g. HDDs) to a higher tier (SSDs) is likely to result in faster access to that data on a subsequent access.

The promotion of data is managed using the adaptive storage tier manager 170. The storage tier manager is adaptive in that it will adapt at least logging activities to the specific circumstances under which it is performing logging. For instance, the adaptive storage tier manager 170 includes a controller 180 for making determinations as to what and how information corresponding to vDisk access requests (vDisk access request data 101) should be logged, where the adaptive logger is responsive to those determinations in performing logging operations. The operation of the adaptive storage tier manager 170 in the context of various arrangement will be discussed further below. However, the operation of the adaptive storage tier manager 170 is briefly discussed her.

The process operates in a loop that is normally initiated by the controller 180. Specifically, the controller 180 selects one or more vDisks for logging and determines parameters for that logging at 181. In some embodiments, the selection and determination are performed using feedback parameters including current vDisk hit rate data, vDisk metadata, and storage pool metadata, where some embodiments also include target hit rate size estimates. In some embodiments, the information used by the controller 180 is operated on to generate one or more scores or rankings and to normalize values as will be discussed subsequently. The target hit rate size estimates are generated in response to a triggering event (e.g. number of accesses, number of reads, number of writes, passing of a period of time, or some combination thereof. Generation of a target hit rate size estimate is discussed in U.S. patent application Ser. No. 15/169,381, filed on May 5, 2016, which is hereby incorporated by reference in its entirety. The operation of the controller will be discussed further in regard to at least FIGS. 2 and 3 below.

In some embodiments, the adaptive logger 172 begins logging access requests according to a default (e.g. all access requests for all vDisks) or last know configuration. In some embodiments, the adaptive logger 172 will only begin operation in response to receiving a logging specification from the controller 180. The adaptive logger 172 upon receipt of some initial specification (e.g. the specification as determined by controller 180) will configure a logging element to log access requests for selected vDisk(s) using determined parameters (e.g. determined by the controller 180). Because of the configuration of the adaptive logger 172, vDisk access request information will be logged for accesses corresponding to selected vDisks and meeting the determined parameters. Subsequently, the logged requests will be analyzed using any known techniques for selecting data for promotion to a higher tier (e.g. one that can be accessed more readily than the lower tier), such as by promoting data that was the subject of a threshold number of accesses in a specified time period. For instance, see item 150 where the activity log data is used to identify requested data and to promote that requested to tier 0. Operation of the adaptive logger 172 will be discussed further in regard to at least FIGS. 2 and 4 below.

FIG. 1B illustrates a clustered virtualization environment including distributed adaptive storage tier managers according to some embodiments. FIG. 1B includes a distributed system using nodes 100a-n comprising user VMs 102a-n, distributed adaptive storage tier managers 170a-n, and hypervisors 130a-n, where each node includes respective storage devices corresponding to the storage pool 160 (See 141aa-cn).

The collection of storage devices of the storage pool 160 correspond to the storage devices of the at least the respective nodes 100a-n can be logically aggregated into the storage pool and used to provide storage for the vDisks 103 discussed above. Thus, the virtual disks (vDisks) can be structured from the storage devices in the storage pool 160, as described in more detail below. As used herein, the term vDisk refers to the storage abstraction to be used by a user virtual machine (VM). Each individual node may have one or more VMs stored on the storage pool 160 in any combination of storage tiers (e.g. storage tier 0-tier n). For instance, node 100a includes user VMs 102a where each user VM is associated with a specific vDisk and those vDisks are managed/owned at least in part by the adaptive storage tier manager 170a. In some embodiments, the data corresponding to each vDisk is stored on any combination of storage tier elements 141aa-cn where the location of the vDisk data is identified using the vDisk mapping metadata 104 previously discussed. Furthermore, in some embodiments the storage tier 0 elements 141aa, 141ba, and 141ca comprise SSDs (e.g. hot-tier) while storage tier n elements 141an, 141bn, and 141cn correspond to HDDs (e.g. cold-tier).

Each node 100a-n runs virtualization software, such as VMware ESX(i), Microsoft Hyper-V, or RedHat KVM. The virtualization software includes a hypervisor 130a-n to manage the interactions between the underlying hardware and the one or more user VMs 102a-n that run client software. In some embodiments, the adaptive storage tier managers 170a-n are not formed as part of specific implementations of hypervisors 130a-n. Instead, the adaptive storage tier managers 170a-n run above hypervisors 130a-n. In some embodiments, the adaptive storage tier managers 170a-n managed the promotion of data of respective vDisks to a hot-tier in a distributed manner by individual managing at least the collection of vDisk access information (corresponding vDisk access request data 101) and the movement of that data on different tiers of the storage pool 160. For instance, each adaptive storage tier manager may operate in a singular mode where the adaptive storage tier manager performs the storage tier management duties for the respective node it resides on (e.g. adaptive storage tier managers 170a performs management duties for only node 100a).

Further details regarding methods and mechanisms for implementing the virtualization environment illustrated in FIG. 1B are described in U.S. Pat. No. 8,601,473, which is hereby incorporated by reference in its entirety.

FIG. 1C illustrates a clustered virtualization environment including distributed adaptive storage tier managers located within controller/service VMs according to some embodiments. In one embodiment, the method and apparatus for using cache size estimations for guiding hot-tier insertion decisions is implemented in a clustered virtualization environment, where the adaptive storage tier manager are interfaced with via a management console remotely or on a node of the cluster itself.

The architecture of FIG. 1C can be implemented for a distributed platform that contains multiple node/servers 100a and 100b that manages the multiple-tiers of storage (see e.g. tiers 0-n). The multiple tiers of storage may include storage that is accessible through a network 140, such as cloud storage 126 or networked storage 128 (e.g., a SAN or "storage area network"). Unlike the prior art, the present embodiment also permits local storage 122/124 that is within or directly attached to the node/server and/or appliance to be managed as part of the storage pool 160. Examples of such storage include SSDs 125 or Hard Disk Drives 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a controller/service virtual machine to be used by a user virtual machine (VM). In some embodiments, the vDisk is exposed via iSCSI ("internet small computer system interface") or NFS ("network file system") and is mounted as a virtual disk on the user VM.

Each node/server 100a or 100b runs virtualization software, such as VMware ESX(i), Microsoft Hyper-V, or RedHat KVM. The virtualization software includes a hypervisor 130a/130b to manage the interactions between the underlying hardware and the one or more user VMs 102a-b that run client software.

A special VM 110a/110b is used to manage storage and I/O activities and include the disclosed adaptive storage tier managers 170a-b according to some embodiment of the invention, which is referred to herein as a "Controller/Service VM". This is the "Storage Controller" in the currently described architecture. Multiple such storage controllers coordinate within a cluster to form a single-system. The Controller/Service VMs 110a/110b are not formed as part of specific implementations of hypervisors 130a/130b. Instead, the Controller/Service VMs run as virtual machines above hypervisors 130a/130b on the various nodes/servers 102a and 102b, and work together to form a distributed system 110 that manages all the storage resources, including the locally attached storage 122/124, the networked storage 128, and the cloud storage 126. Since the Controller/Service VMs run above the hypervisors 130a/130b, this means that the current approach can be used and implemented within any virtual machine architecture, since the Controller/Service VMs of embodiments of the invention can be used in conjunction with any hypervisor from any virtualization vendor.

Each Controller/Service VM 110a-b exports one or more block devices or NFS server targets that appear as disks to the client VMs 102a-d. These disks are virtual, since they are implemented by the software running inside the Controller/Service VMs 110a-b. Thus, to the user VMs 102a-d, the Controller/Service VMs 110a-b appear to be exporting a clustered storage appliance that contains some disks. All user data (including the operating system) in the client VMs 102a-d resides on these virtual disks.

The storage devices that are used to make up the storage pool 160 can be organized into different storage tiers. For instance, SSDs that are locally attached to nodes can be treated as a highest storage tier. HDDs that are locally attached to nodes can be treated as a second highest storage tier. A network attached storage device (e.g. SAN) on a shared local network can be treated as a third storage tier. A cloud storage aspect can be treated as a fourth storage tier. Thus, devices or the storage they provide to the storage pool can be treated as being divided logically into different storage tiers according to the speed in which they can be accessed. Furthermore, the adaptive storage tier management techniques discussed herein can be applied between any levels of the storage tiers to determine when to promote vDisk data to a higher tier. However, for the sake of simplicity we will discuss the promotion process and adaptive storage tier management techniques in the context of promotion to the highest tier, regardless of what tier that data currently resides in.

In some embodiments, the techniques disclosed herein can be combined with allowing the virtualization system to access and utilize local (e.g., server-internal) storage 122 as disclosed herein to achieve significant additional performance advantages. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125. Further details regarding methods and mechanisms for implementing the virtualization environment illustrated in FIG. 1 are described in U.S. Pat. No. 8,601,473, which is hereby incorporated by reference in its entirety.

Figure 2:
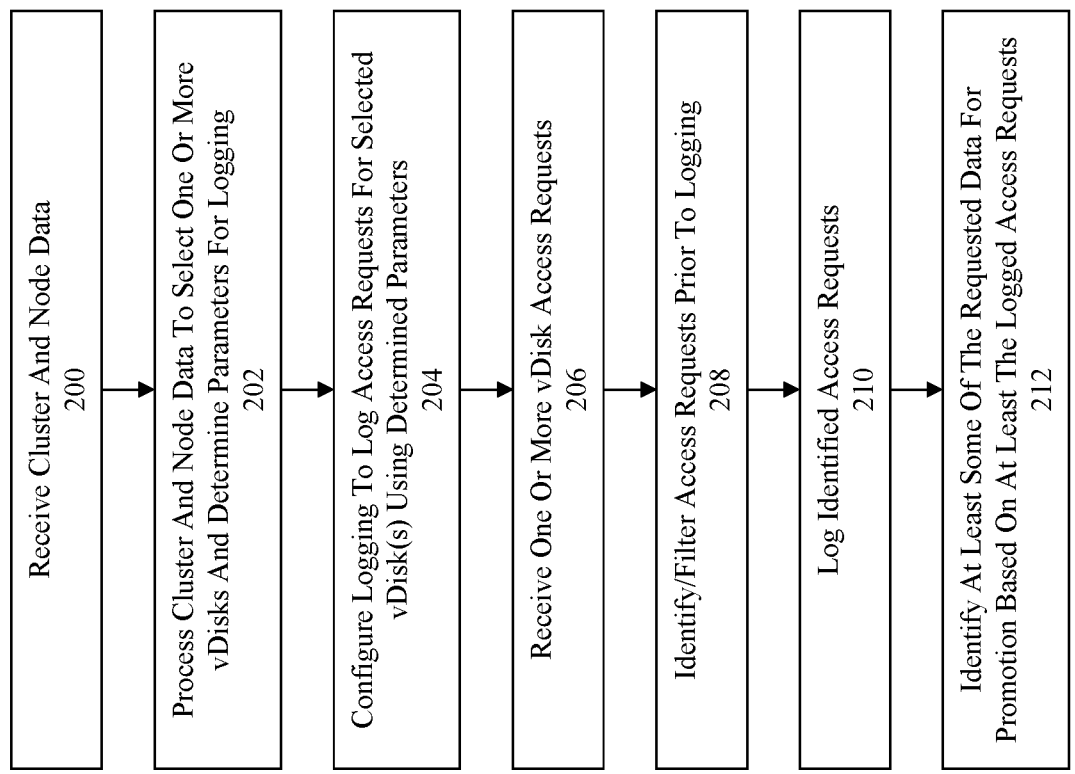
FIG. 2 illustrates a flowchart for using cache size estimations to guiding hot-tier insertion decisions in accordance with some embodiments.

FIG. 2 illustrates a flowchart for using cache size estimations to guiding hot-tier insertion decisions in accordance with some embodiments.

In some embodiments, the process starts at 200 where cluster and node data is received. Generally, this data corresponds to information about where data of the vDisks (vDisk metadata), or relevant vDisks, are stored with respect to the tiers of the storage pool and how frequently that data is accessed. For instance, the storage pool metadata may indicate the total amount of storage available and used of the storage pool, including at the global used and unused amounts and the used and unused amounts for each tier. Other storage pool metadata may correspond to access rates (either directly attached to a node, over a local network, or over a remote network) where storage pool metadata is relevant to the load on the storage pool and may be used as a factor to increase/decrease the promotion or logging thresholds to lower the burden on the storage pool for performing identified promotions.

In some embodiments, vDisk(s) metadata indicates the distribution (e.g. storage tiers/locations) of the data comprising the vDisk(s) such as on the storage pool. The hit rate data corresponds to respective vDisk(s) of the vDisks. For instance, a node hosting 32 vDisks receives hit rate values for each of the respective 32 vDisks. Hit rate values comprise a percentage of accesses that hit in a specific/hot tier (e.g. tier 0) over a given period of time. Where a particular vDisk has not been access for an identified period of time that hit rate data can correspond to any combinations of a default value, a null value, an error value, or a last known value. In some embodiments, the hit rate data can be accompanied by a frequency of access and time of last access value. Such values can be used to weight or otherwise exclude vDisks from logging.

Target hit rate size estimates correspond to estimated amounts of storage required to increase the current hit rate by a given interval. For instance, a first vDisk has a current hit rate in the hot-tier of 53% and increasing the hit rate to 54% (e.g. by 1%) is estimated to require 1.5 gigabytes (GBs), while a second vDisk has a current hit rate of 56% and increasing the hit rate to 57% (e.g. by 1%) is estimated to require 0.5 GBs. Use and determination of target hit rate size estimates is discussed further below. However, generation of a target hit rate size estimate is discussed in U.S. patent application Ser. No. 15/169,381, filed on May 5, 2016.

Figure 3:
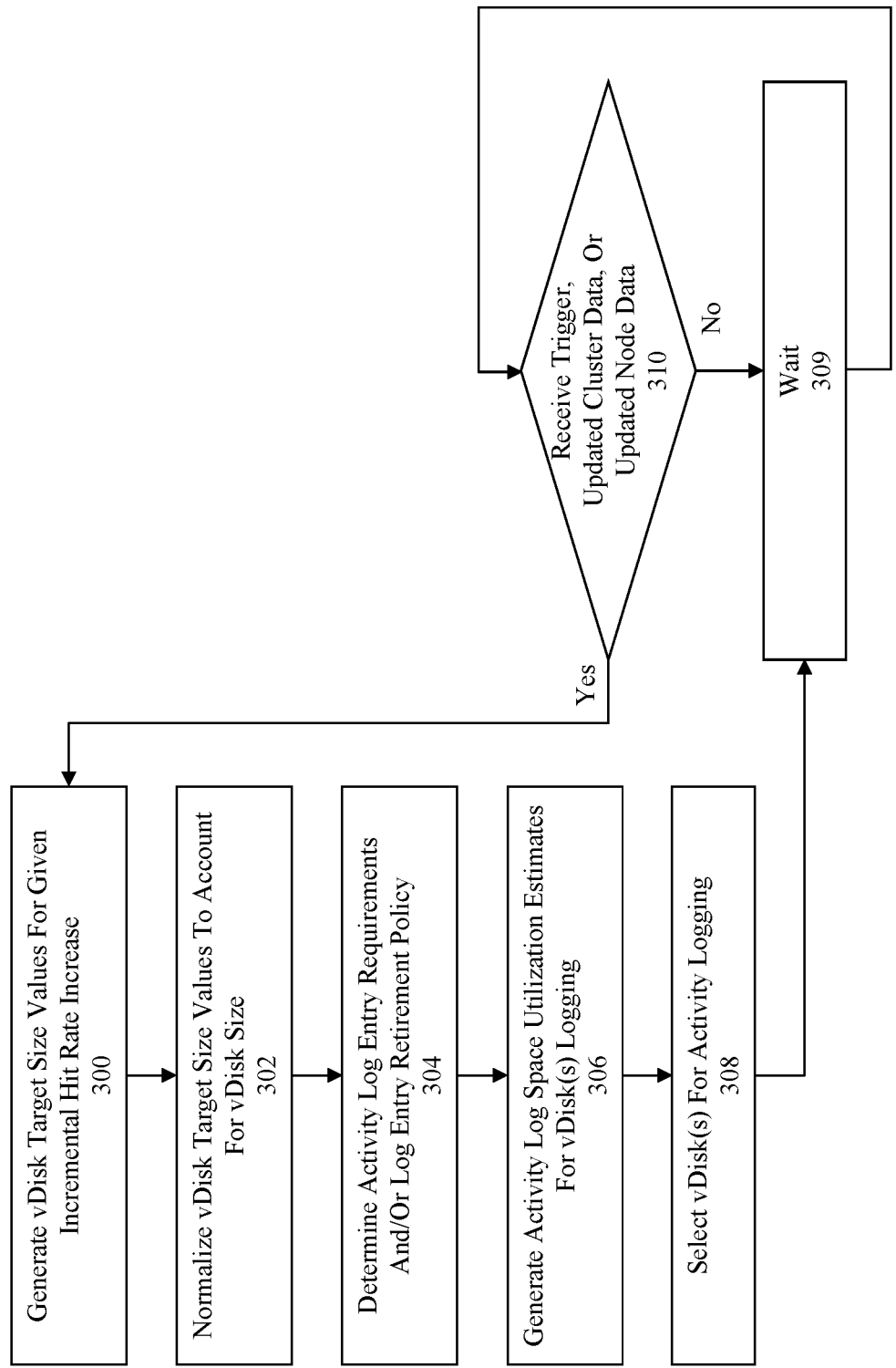
FIG. 3 illustrates an example flowchart for performing the process cluster and node data to select one or more vDisks and determine parameters for logging step illustrated in FIG. 2.

At 202, cluster and node data is processed to select one or more vDisks and determine parameters for logging. FIG. 3 is directed to illustrating a specific implementation of step 202. However, briefly the process includes selecting a subset of vDisks from a set of vDisks to be logged and when type of accesses, amount of accesses, and/or period of accesses to log based on one or more factors. Thus, the available resources for logging access information can be tailored to operate in the area that would be most beneficial as determined by the one or more factors.

Logging is configured at 202 to log access requests for selected vDisk using the determined parameters. In some embodiments, logging is initially configured using a last known or default configuration. For instance, upon bootup logging defaults to logging all access requests for all vDisks, where once configuration information is received the logging apparatus is reconfigured according to the selection of the vDisks and the parameters for logging. Subsequently the older accesses which may include access request information for vDisks not currently monitored will drop off the log as newer entries are added. In some embodiments the logging is configured at the level of the node where each node performs appropriate determinations for the vDisks managed by that node and maintains the log locally in volatile memory or cache. Logging is discussed further in regard to FIG. 4.

At 206 vDisk access request information is received over a period of time. The received access requests are processed in the order they are received to selected-in desired entries or filter-out unwanted entries at 208, prior to storing, at 210, the selected-in entries or remaining entries after filtering. The identifying/filtering of 208 is performed as dictated by step 204.

At 212 requested data corresponding to the access request (e.g. read or written data) is promoted from a lower tier to a higher tier. For instance, upon the occurrence of a third access during a specified time interval the accessed data is promoted to a higher tier. However, any other technique or collection of rules can be used to determine which particular requested data should be promoted. Furthermore, in some embodiments, the rules applied for promotion can be adjusted using one or more factors to account for the current status of the system. For example, if the hot-tier for the storage pool is filling up there will be less space for promoted data. Thus, normally the older data would be demoted to a lower tier. However, this may generate too much churn in the data and thus slow down accesses to the storage pool due to the additional I/O operations generated to manage the data in the storage tiers. Thus, a factor can be used that is inversely proportional to the fullness of the hot-tier to increase the promotion threshold—e.g. used to decrease a corresponding sliding time window, or to increase the number of occurrences required for promotion. In some embodiments, the load on the storage pool (e.g. number of I/O accesses and/or disk space used of the hot-tier) can be used as a factor to decrease the number of vDisks that will be logged and/or to exclude access types from being logged. Thus, resulting in less data for promotion.

Additionally, during operation of the logging function additional or updated data can be received or a triggering event may occur to cause the repetition of steps 200, 202, and 204 and the continuing operation of steps 206, 208, 210. And 212 though potentially having an update configuration.

FIG. 3 illustrates an example flowchart for performing the process cluster and node data to select one or more vDisks and determine parameters for logging step illustrated in FIG. 2. Some or all the steps illustrated here may be implemented, whether in the order illustrated or in a different order.

The process starts at 300, where vDisk target size values are generated for a given incremental hit rate increase. The target size values comprise an estimate of the amount of storage that would be required in an identified tier (e.g. the hot-tier) to achieve the incremental hit rate increase. Thus, each vDisk would be associated with an estimate of how much additional data would need to be moved into the identified tier to achieve a common hit rate increase amount (e.g. 1%). The estimates can be calculated using the received/updated target hit rate size estimates previously discussed above and in U.S. patent application Ser. No. 15/169,381, filed on May 5, 2016. For instance, the received target hit rate size estimates comprise singular values for each vDisk (e.g. a first vDisk needing an estimated 100 gb to reach a 90% hit rate), the target hit rate size estimates specify different sizes for a number of different target hit rates (e.g. 10 GB to achieve a 50% hit rate, 14 Gb to achieve an 80% hit rate, and 18 GB to achieve a 90% hit rate), or the target hit rate size estimates are divided into any number of size estimates (e.g. size estimates of the storage necessary to achieve a 10/20/30/40/50/60/70/80/90% hit rate for each vDisk). Regardless of what form the hit rate size estimates are received in, a size value is determined for each vDisk for a specified hit rate increase (see e.g. FIGS. 5A-H for an illustrate example).

In some embodiments, the generated vDisk target size values are normalized to account for differences in vDisk size at 302. For instance, if one vDisk is 1 GB while another vDisk is 100 GB the target hit rate size estimates are probably going to be proportional to the vDisk size—e.g. the 1 GB vDisk requires 500 MB to achieve a 90% hit rate while the 100 GB vDisk requires 50 GB to achieve the same 90% hit rate. Thus, if nothing is done to account for the differences in the size of the vDisks the smaller vDisk will almost always be favored because the smaller vDisk will be associated with a much lower resource utilization for achieving the same target hit rate increase. In some embodiments, the normalization is with respect to an individual node or with respect to all nodes of a cluster. In some embodiments, the normalization of the vDisk target size values may comprise or be included in a process to generate scores or rankings of a computed desirability for increasing the hit rate of a given vDisk with respect to best utilizing any available tier storage. For example, frequency of access, associated service level agreement, the current vDisk hit rate, or vDisk prioritization information can be used as factors in determining weights or rankings—e.g. using static or dynamic adjustments to generate scores such as by using proportional factors, inversely proportional factors, or static or stair stepped factors. FIGS. 5A-H below illustrate such a process including a normalization, as a weight, for a set of vDisks.

At 304 activity log entry requirements and/or retirement policy information is identified. For instance, a configuration file is read that specifies one or more conditions and under what circumstances those conditions should be applied. The conditions include any combination of maximum or minimum number of vDisks to enable for logging, maximum or minimum log size, time or number of entries corresponding to a piece of data that are to be logged, types of access that are to be logged or excluded from logging, and log retirement policies such as least recently used. Furthermore, in some embodiments other factors can be used to modify the logging parameters, such as a factor for lowering the maximum log size proportionally with available storage space in the storage tier (e.g. hot-tier).

At 306 estimates of activity log space utilization are generated. For instance, vDisk log utilization estimates may be provided based on a default value, a value generated from past log utilization, or during a current time period, whether those utilization estimates are generated using either a weighted running average or a value based only on a particular time period. This can be accomplished in different ways. One way includes recording an activity log fullness level at periodic intervals. Another way to determine such estimates is to maintain a data structure that tracks when entries are retired from the activity log, possibly utilizing a sliding time window to capture only entries that are retired prior to aging out of the sliding time window. In some embodiments, retirement data is maintained in a data structure comprising separate time stamped records for each retired entry. In some embodiments, the data structure comprises records representing the aggregate number of entries retired during a given interval or period which may be a multiple of the sliding time window. Additionally, different instances of the same data structure may be maintained for each vDisk being logged along with what types of accesses are being excluded, or a single instance of the data structure may be maintained for vDisks being logged by a respective processing device (e.g. node) along with the number and size of vDisks being logged and types of accesses excluded.

At 308 vDisk(s) are selected for activity logging. For instance, the normalized vDisk target size values or weighted values are used to select one or more vDisks for logging. In some embodiments, a predetermined number of vDisks are selected for logging. In some embodiments, the activity log space utilization estimates are used to select a number of vDisks that would not exceed the available storage limits. Regardless of the combination of vDisks selected for logging the process will wait at step 309.

After a given time period has passed the process proceeds to 310 where a determination is made as to whether the process should return to step 300. For instance, if a trigger (e.g. periodic trigger), updated cluster data (e.g. new node, hit rate data for the cluster, or change in available capacity above a specified threshold), or updated node data (e.g. new physical storage media added to the node) is received the process will return to step 300 to make a new determine as to what vDisk(s) accesses should be logged and what corresponding parameters should be used for logging. In some embodiments, a trigger comprises a periodic signal for triggering rebalancing of the logging activities.

Figure 4:
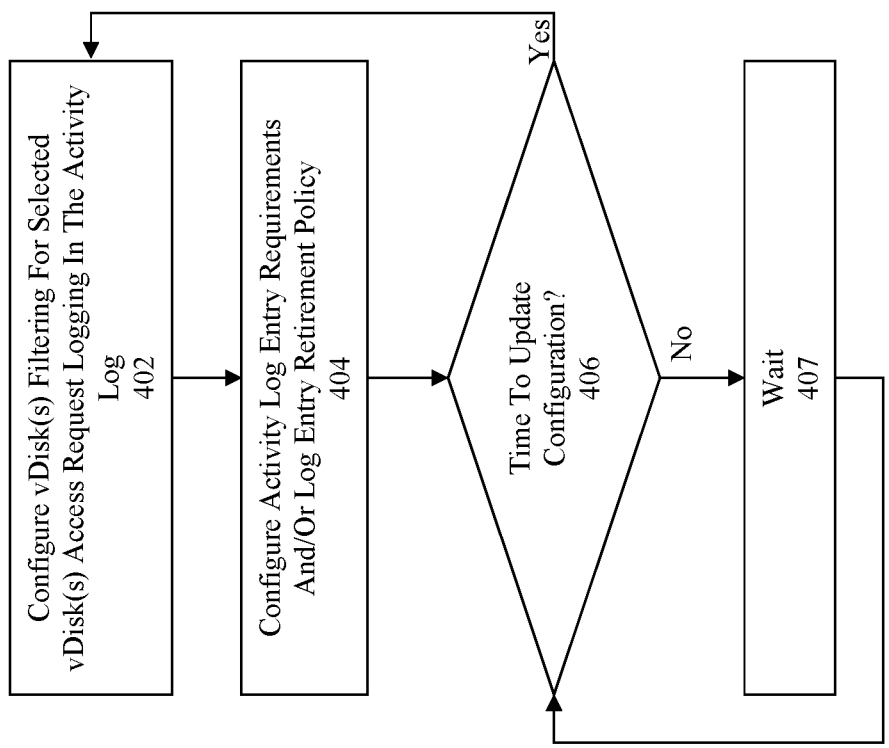
FIG. 4 illustrates an example flowchart for performing the configure logging to log access requests for selected vDisk (s) using determined parameters step illustrated in FIG. 2.

FIG. 4 illustrates an example flowchart for performing the configure logging to log access requests for selected vDisk (s) using determined parameters step illustrated in FIG. 2.

The process starts at 402 where activity is identified for selected vDisks. For instance, a filtering is configured to exclude vDisk(s) not matching any one of the selected vDisks or matching is configured to select only the vDisk(s) selected. For example, a filter is configured to exclude all access requests corresponding to vDisks that were not selected such that those access requests are not written to the activity log in any form.

The process of 402 continues at 404 where entry requirements and a retirement policy are configured. For the entry requirements, certain types of accesses can be excluded from tracking (e.g. entry into the activity log), such as requests that are part of a large data access for serially accessing a set of data. Additionally, the retirement policy is implemented. The retirement policy can comprise any of retiring, the oldest entry, the least recently used entry, the oldest entry for a respective vDisk when a new access request is received for the same vDisk, the least recently used entry for a respective vDisk when a new access request is received for the same vDisk, retiring entries from the log when those entries correspond to data identified for promotion into a higher storage tier and when that data is promoted, or retiring entries corresponding to the determined ranking for the accesses corresponding vDisk (e.g. accesses for lower ranked vDisk entries first and/or proportionally with vDisk rank).

At 406 a determination is made as to whether it is time to update the configuration. In some embodiments, such a determination is triggered by the receipt of updated configuration information. In some embodiments, a timer or other triggering element is used to cause a request for updated configuration information to be transmitted. Regardless of how the triggering is performed and/or its conditions, the process will return to 402 for reconfiguration if it is time to update the configuration or will proceed to 407 where a time period is waited before again making the 406 determinations.

FIGS. 5A-H illustrate the operation of a system according to some embodiments.

FIG. 5A illustrates an example system having four vDisks for the purpose of providing an illustrative example, though most systems would have many more vDisks.

In some embodiments, vDisks 1-4 correspond to vDisks on a single computing device. In some embodiments, the vDisks 1-4 correspond to vDisks owned by a single node such as node 100a illustrated in FIGS. 1B-C, where the node is part of a plurality of nodes organized as a cluster, and where each node may perform a similar process to determine which vDisks to select for logging. In some embodiments, the vDisks 1-4 correspond to all vDisks within a computing cluster and are processed at a central or elected leader node for all nodes/vDisks. Furthermore, the illustration includes table 501 which is illustrative of the state of data used for making the selection of the vDisks, and which may be illustrative of a data structure maintained for making the selection of the vDisks.

FIG. 5B illustrates the receipt of the target hit rate size estimates previously discussed. The target hit rate size estimates are received by the controller 180 and populated into table 501.

As illustrated, table 501 is populated with three columns that intersect with rows for each vDisk and include a header value. As illustrated, vDisk 1 is estimated to require 42 GB of data in a hot tier to achieve a 50% target hit rate, 48 GB to achieve an 80% target hit rate, and 50 GB to achieve a 90% target hit rate. Similarly, for the corresponding hit rates, vDisk 2 is estimated to require 36 GB, 46 GB, and 60 GB, vDisk 3 is estimated to require 3 GB, 4 GB, and 5 GB, and vDisk 4 is estimated to require 36 GB, 50 GB, and 90 GB.

Figure 5C:
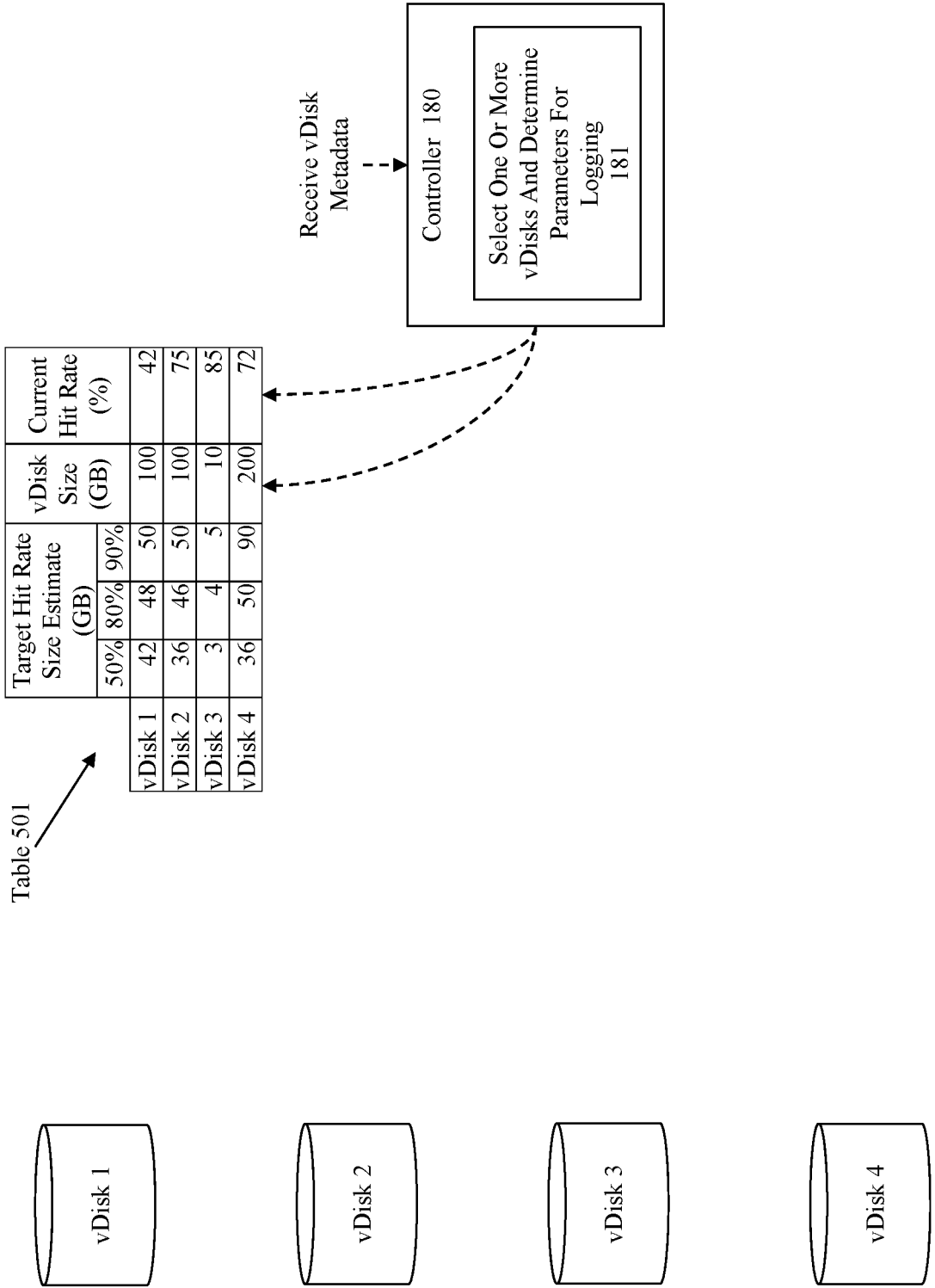

FIG. 5C illustrates the receipt of vDisk metadata by controller 180 as previously discussed. For instance, table 501 has been updated to include a column representing the current vDisk size in gigabytes, and the current hit rate represented by percentages. For instance, vDisk 1 and 2 are both 100 GB, while vDisk 3 is the smallest at 10 GB, and vDisk 4 is the largest at 200 GB. Additionally, the current hit rates for each vDisk are identified by the current hit rate (%) column which is populated with the received metadata as 42% for vDisk 1, 75% for vDisk 2, 85% for vDisk 3, and 72% for vDisk 4.

Figure 5D:
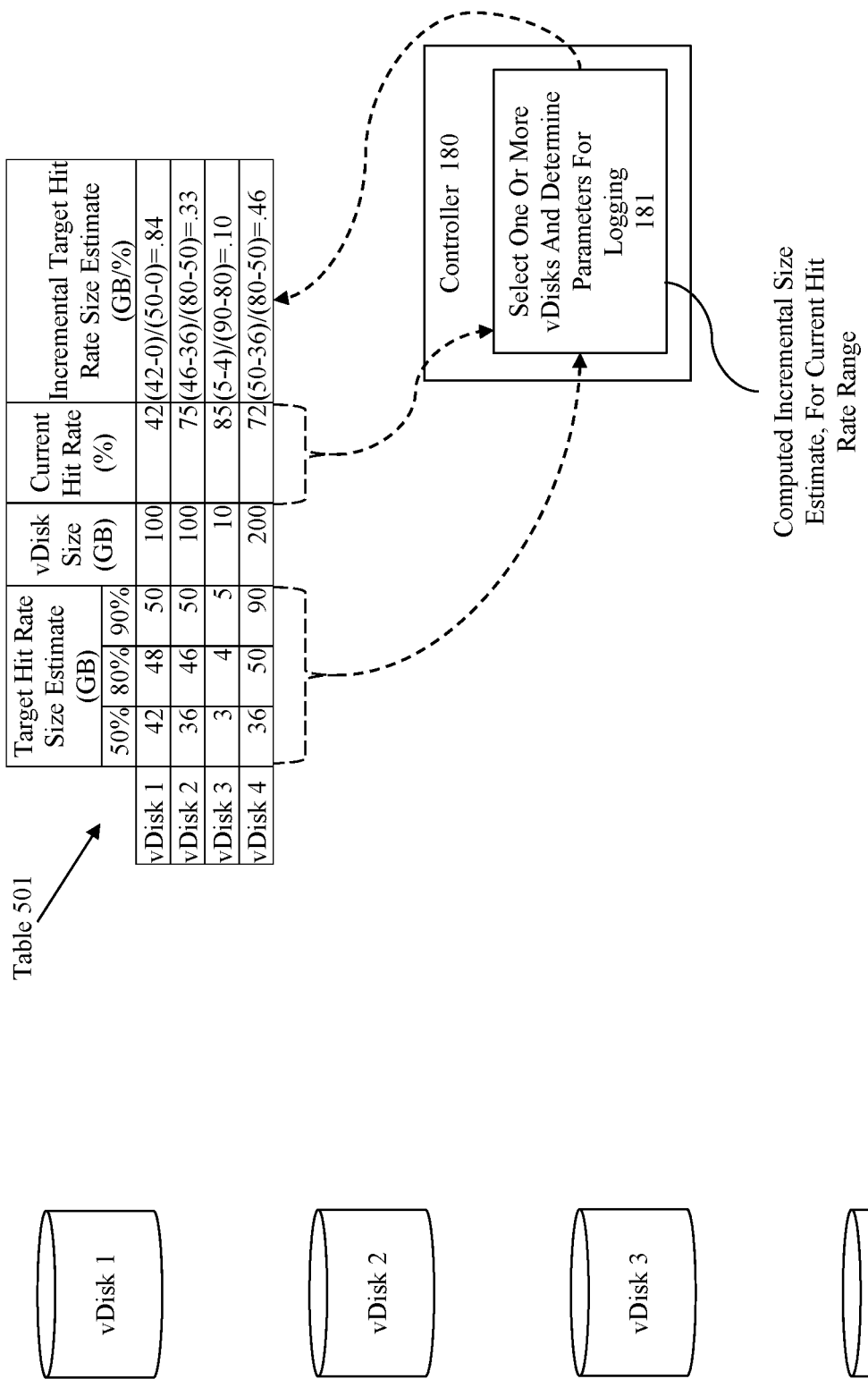

FIG. 5D illustrates the determination of the incremental target hit rate size estimates in gigabytes needed for each percentage increase as part of selecting one or more vDisks and determining parameters for logging at 181.

The incremental target hit rate size estimates are determine based on at least the target hit rate size estimate corresponding to the current hit rate. This can be represented by:

$$\text{Cost per increased hit rate percent} = \frac{H_{cse} - L_{cse}}{H_{hitrate} - L_{hitrate}}$$

Where the parameters:
$H_{cse}$=The corresponding high cache size estimate,
$L_{cse}$=The corresponding low cache size estimate,
$H_{hitrate}$=The high hit rate corresponding to the high cache size estimate, and
$L_{hitrate}$=The low hit rate corresponding to the low cache size estimate,
where the current hit rate falls between the corresponding high hit rate and the low hit rate. For vDisk 1 the current hit rate is 42% which fall below the 50% hit rate (we assume zero percent hit rate has zero data stored in the hot tier). Thus, the estimated cost per increased hit rate percent is $$\frac{42 - 0}{50 - 0}$$

which is equal to 85 GB per a 1% increase. vDisk 2 has a current hit rate of 75% which falls between the 50% and 80% target hit rate size estimates. Thus, the estimated cost per increased hit rate percent is $$\frac{46 - 36}{80 - 50}$$

which is equal 0.33 GB per a 1% increase. Similarly, vDisk 3 is estimated at 0.10 GB per 1% increase $$\left(\frac{5 - 4}{90 - 80}\right)$$

and vDisk 4 estimated at 0.46 GB per 1% increase $$\left(\frac{50 - 36}{80 - 50}\right).$$

Figure 5E:
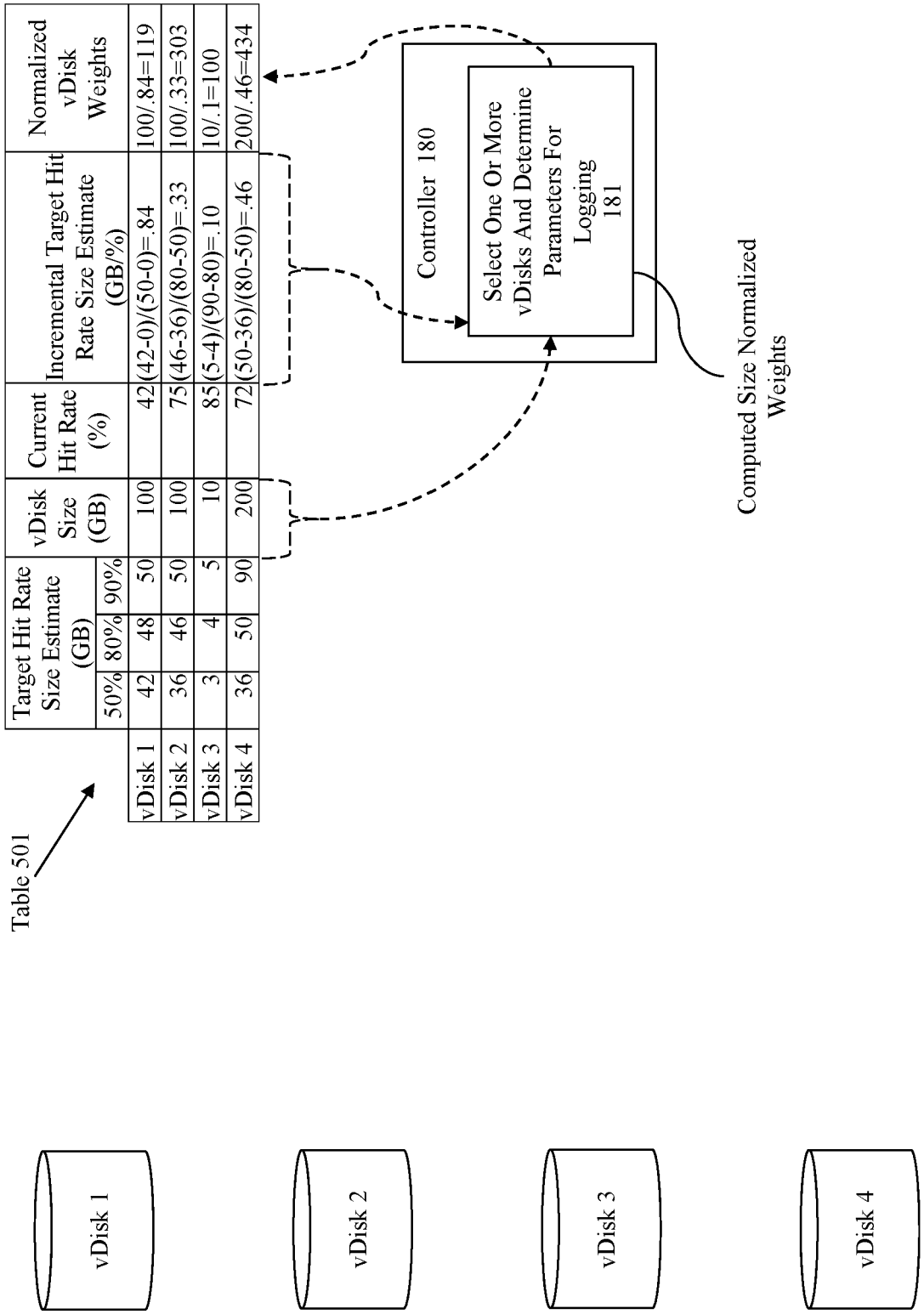

FIG. 5E illustrates a normalization method for normalizing the corresponding incremental target hit rate size estimation for each vDisks to generate weights for use in selecting vDisks for logging as part of the process for selecting of the one or more vDisks and determining the parameters for logging. Note that the general presumption that the lower the GBs used for a corresponding hit rate increase the better or more efficient the utilization of the higher tier (e.g. hot-tier) fails to account for disproportionately sized vDisks. For instance, a vDisk having only 10 GBs of data is likely to be identified as requiring a lower amount of storage space utilization in a hot-tier merely because the vDisk is smaller than say a vDisk having 100 GB of data to achieve the same hit rate. Thus, to avoid promoting data essentially based on the vDisk size we normalize our incremental target hit rate size estimates.

Here we illustrate a simple normalization method by dividing the vDisk Size (in GBs) by the determined incremental target hit rate size estimate for that vDisk. Thus, vDisk 1 has a normalized vDisk weight of 119, vDisk 2 has a normalized vDisk weight of 303, vDisk 3 has a normalized vDisk weight of 100, and vDisk 4 has a normalized vDisk weight of 434 (using this method the higher the normalized weight the more efficient the utilization of storage space in the hot tier). Here, prior to normalization a simple ranking, in order of desirability, would be vDisk 1, 2, 4, and then 3. However, after normalization a similar ranking, in order of desirability, would be vDisk 4, 2, 1, and then 3. Additionally, calculation of the normalized vDisk weights can be combined with the application of other factors to generate rankings or scores for the vDisks, such as frequency of access, time last accessed, or another factors as previously discussed.

Figure 5F:
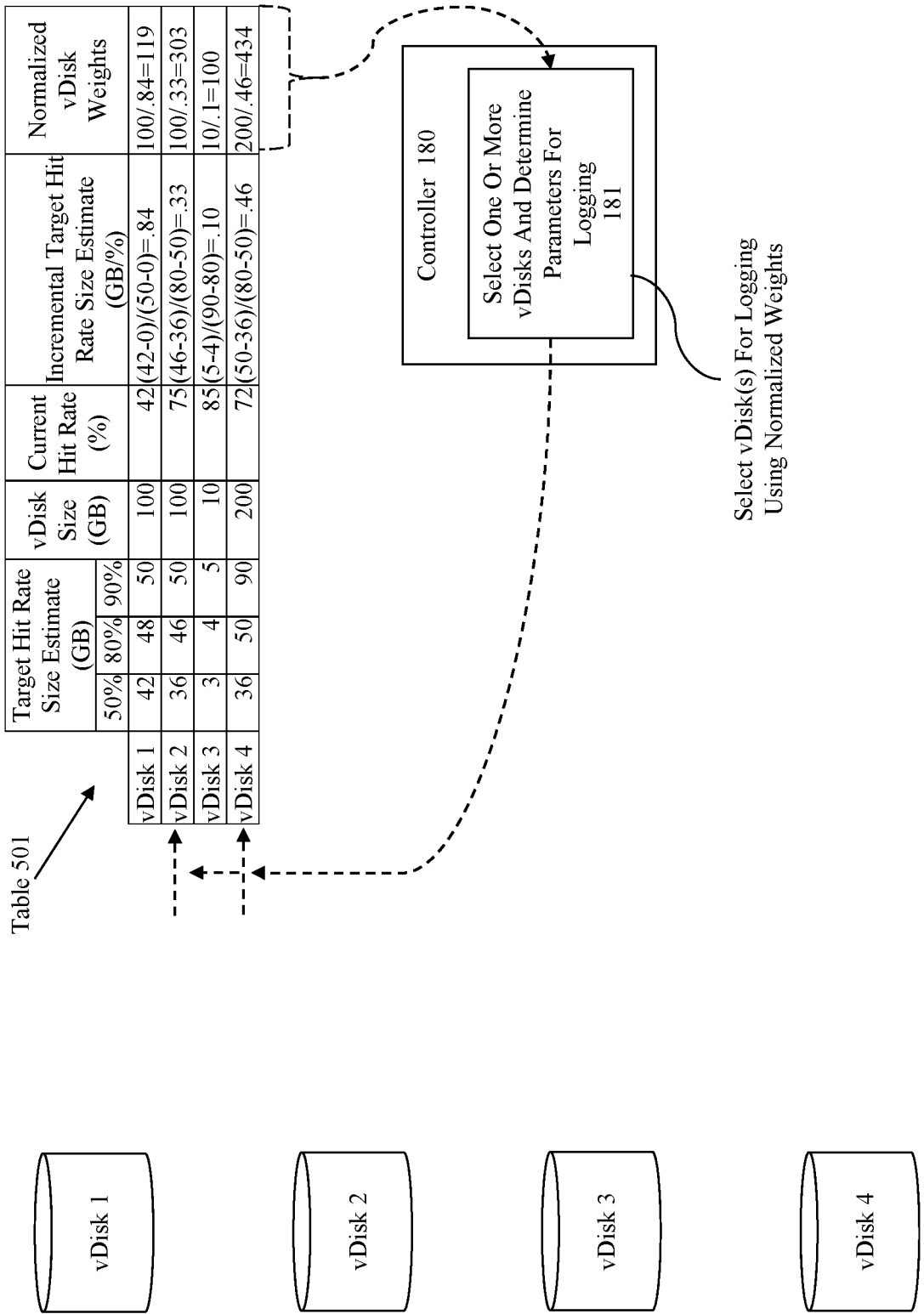

FIG. 5F illustrates the selection of vDisks for logging based on their weights or rankings. For instance, at 181 the selection of the one or more vDisks and determination of the parameters for logging it is determined that there is only sufficient logging space in the log for logging 2 vDisks. Thus, the two highest scoring vDisks (vDisks 2 and 4) are selected for logging. The determination of the relevant parameters for logging can be determined as previously discussed, such as based on a default parameter of logging or based on a determination made using a rule base.

Figure 5G:
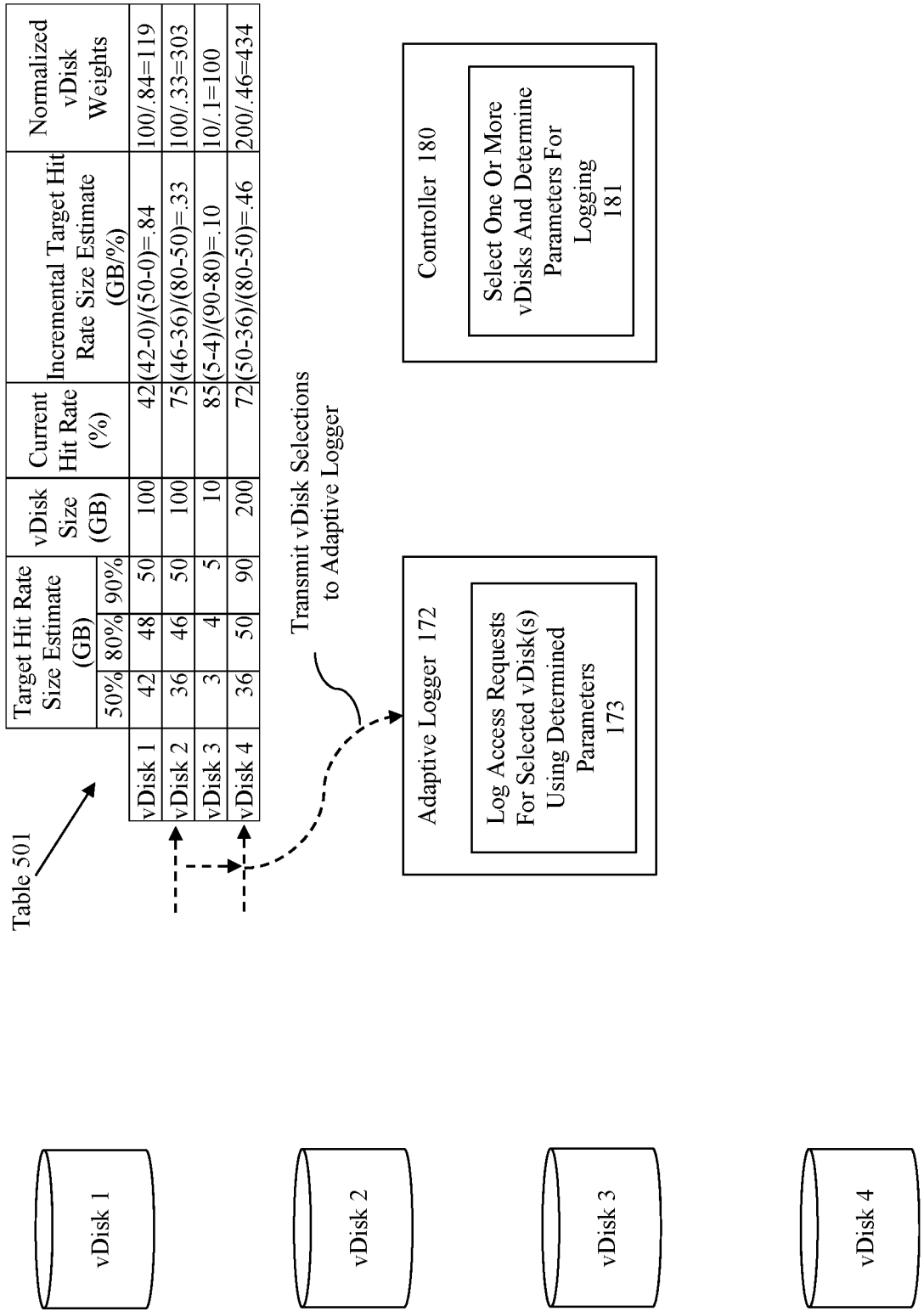
Figure 5H:
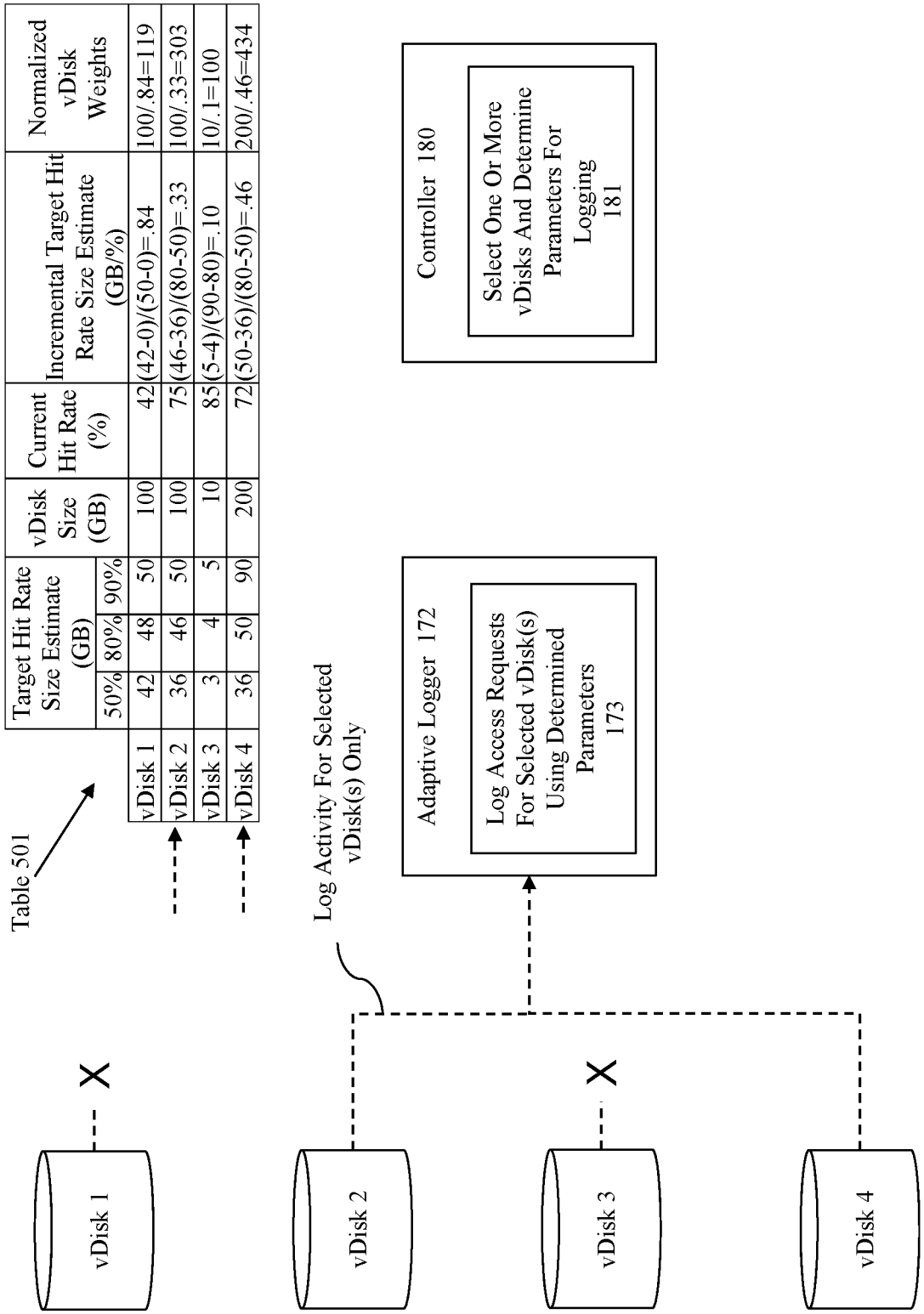

FIG. 5G illustrates the transmission of the vDisk selections to the adaptive logger 172 as previously discussed. FIG. 5H illustrates the configuration of the adaptive logger 172 to log access requests for selected vDisks using determine parameters at 173, and the logging of access requests corresponding to those vDisks (here vDisks 2 and 4) as specified by the vDisk selections received.

Figure 6A:
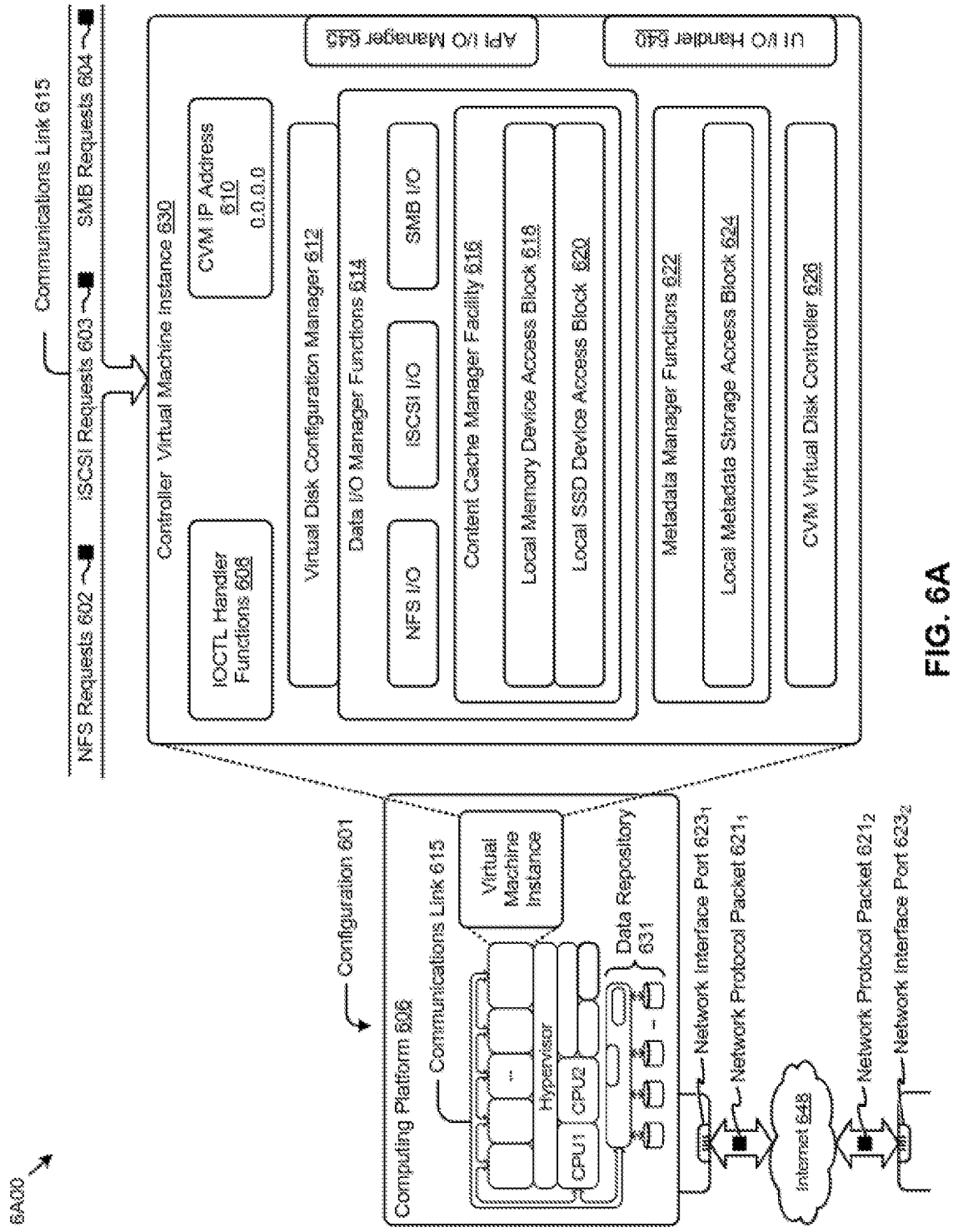
FIG. 6A illustrates a virtualized controller as implemented by the shown virtual machine architecture in which some embodiments are implemented.

FIG. 6A illustrates a virtualized controller as implemented by the shown virtual machine architecture in which some embodiments are implemented. FIG. 6A depicts a virtualized controller as implemented by the shown virtual machine architecture 6A00. The heretofore-disclosed embodiments including variations of any virtualized controllers can be implemented in distributed systems where a plurality of networked-connected devices communicate and coordinate actions using inter-component messaging. Distributed systems are systems of interconnected components that are designed for or dedicated to storage operations as well as being designed for, or dedicated to, computing and/or networking operations. Interconnected components in a distributed system can operate cooperatively so as to serve a particular objective, such as to provide high-performance computing, high-performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyper converged system coordinates efficient use of compute and storage resources by and between the components of the distributed system. Adding a hyper converged unit to a hyper converged system expands the system in multiple dimensions. As an example, adding a hyper converged unit to a hyper converged system can expand in the dimension of storage capacity while concurrently expanding in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyper converged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyper converged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as containers. In some systems and/or environments, hypervisor-assisted virtualization techniques and operating system virtualization techniques are combined.

As shown, the virtual machine architecture 6A00 comprises a collection of interconnected components suitable for implementing embodiments of the present disclosure and/or for use in the herein-described environments. Moreover, the shown virtual machine architecture 6A00 includes a virtual machine instance in a configuration 601 that is further described as pertaining to the controller virtual machine instance 630. A controller virtual machine instance receives block I/O (input/output or IO) storage requests as network file system (NFS) requests in the form of NFS requests 602, and/or internet small computer storage interface (iSCSI) block IO requests in the form of iSCSI requests 603, and/or Samba file system (SMB) requests in the form of SMB requests 604. The controller virtual machine (CVM) instance publishes and responds to an internet protocol (IP) address (e.g., CVM IP address 610). Various forms of input and output (I/O or IO) can be handled by one or more IO control handler functions (e.g., IOCTL functions 608) that interface to other functions such as data IO manager functions 614 and/or metadata manager functions 622. As shown, the data IO manager functions can include communication with a virtual disk configuration manager 612 and/or can include direct or indirect communication with any of various block IO functions (e.g., NFS TO, iSCSI IO, SMB TO, etc.).

In addition to block IO functions, the configuration 601 supports IO of any form (e.g., block TO, streaming TO, packet-based TO, HTTP traffic, etc.) through either or both of a user interface (UI) handler such as UI IO handler 640 and/or through any of a range of application programming interfaces (APIs), possibly through the shown API IO manager 645.

The communications link 615 can be configured to transmit (e.g., send, receive, signal, etc.) any types of communications packets comprising any organization of data items. The data items can comprise payload data, a destination address (e.g., a destination IP address), and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. Additionally, the payload may comprise a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 630 includes a content cache manager facility 616 that accesses storage locations, possibly including local dynamic random access memory (DRAM) (e.g., through the local memory device access block 618) and/or possibly including accesses to local solid state storage (e.g., through local SSD device access block 620).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 631, which in turn can be formatted into any one or more storage areas, and which can comprise parameterized storage accessible by a key (e.g., a filename, a table name, a block address, an offset address, etc.). An external data repository 631 can store any forms of data and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 624. The external data repository 631 can be configured using a CVM virtual disk controller 626, which can in turn manage any number or any configuration of virtual disks.

Execution of the sequences of instructions to practice certain embodiments of the disclosure are performed by one or more processors, or a processing element such as a data processor, or such as a central processing unit (e.g., CPU1, CPU2). According to certain embodiments of the disclosure, two or more instances of a configuration 601 can be coupled by a communications link 615 (e.g., backplane, LAN, PSTN, wired or wireless network, etc.) and each instance may perform respective portions of sequences of instructions as may be required to practice embodiments of the disclosure.

The shown computing platform 606 is interconnected to the Internet 648 through one or more network interface ports (e.g., network interface port 6231 and network interface port 6232). The configuration 601 can be addressed through one or more network interface ports using an IP address. Any operational element within computing platform 606 can perform sending and receiving operations using any of a range of network protocols, possibly including network protocols that send and receive packets (e.g., network protocol packet 6211 and network protocol packet 6212).

The computing platform 606 may transmit and receive messages that can be composed of configuration data, and/or any other forms of data and/or instructions organized into a data structure (e.g., communications packets). In some cases, the data structure includes program code instructions (e.g., application code) communicated through the Internet 648 and/or through any one or more instances of communications link 615. Received program code may be processed and/or executed by a CPU as it is received and/or program code may be stored in any volatile or non-volatile storage for later execution. Program code can be transmitted via an upload (e.g., an upload from an access device over the Internet 648 to computing platform 606). Further, program code and/or results of executing program code can be delivered to a particular user via a download (e.g., a download from the computing platform 606 over the Internet 648 to an access device).

The configuration 601 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A cluster is often embodied as a collection of computing nodes that can communicate between each other through a local area network (e.g., LAN or VLAN) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provision of power to the other units. In some cases, a unit in a rack is dedicated to environmental conditioning functions such as filtering and movement of air through the rack, and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets or can be configured as one VLAN. Multiple clusters can communicate between one module to another over a WAN (e.g., when geographically distal) or LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Further details regarding general approaches to managing data repositories are described in U.S. Pat. No. 8,601,473 titled, "ARCHITECTURE FOR MANAGING I/O AND STORAGE FOR A VIRTUALIZATION ENVIRONMENT" issued on Dec. 3, 2013 which is hereby incorporated by reference in its entirety.

Further details regarding general approaches to managing and maintaining data in data repositories are described in U.S. Pat. No. 8,549,518 titled, "METHOD AND SYSTEM FOR IMPLEMENTING MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 6B:
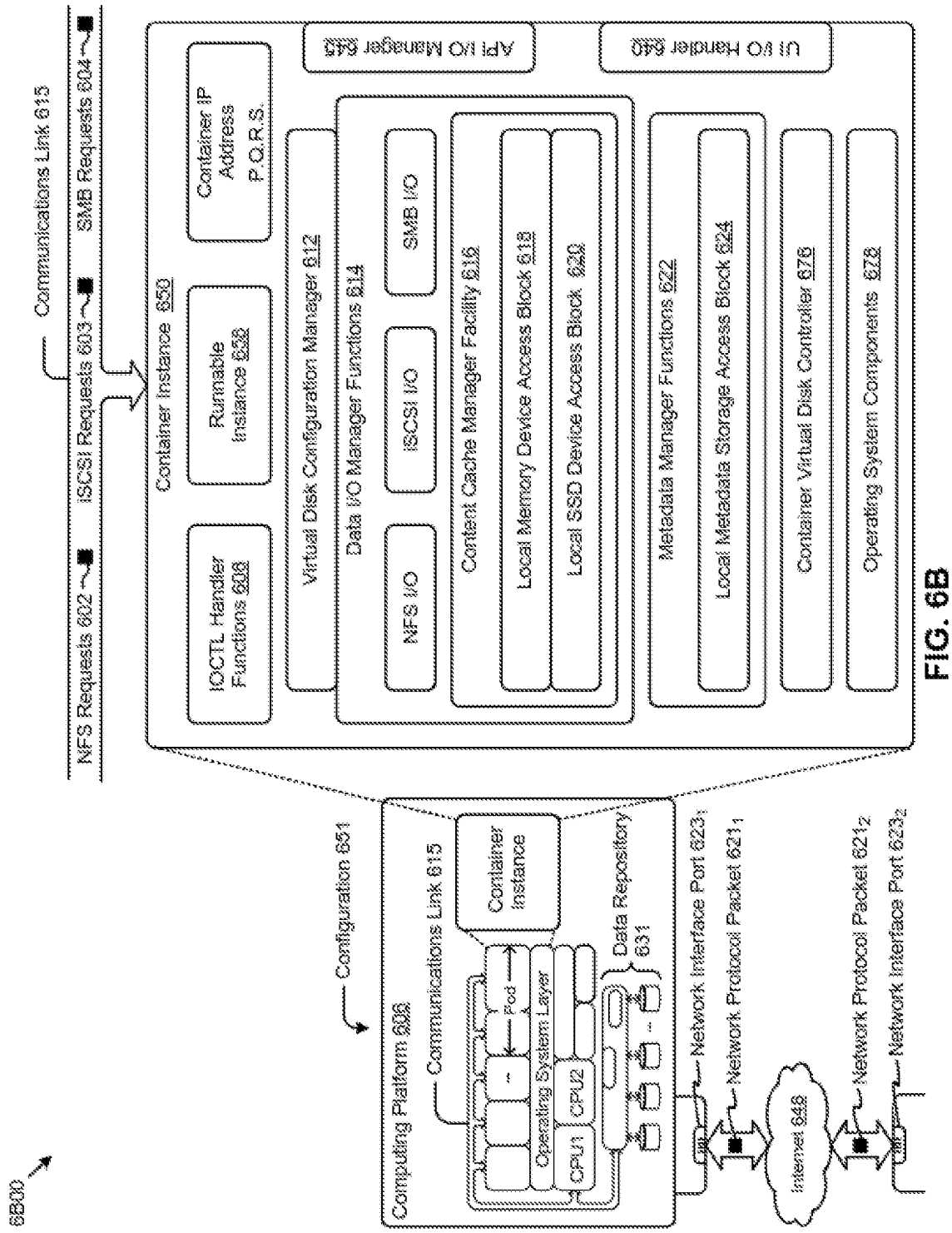
FIG. 6B illustrates a virtualized controller implemented by a containerized architecture in which some embodiments are implemented.

FIG. 6B illustrates a virtualized controller implemented by a containerized architecture in which some embodiments are implemented. FIG. 6B depicts a virtualized controller implemented by a containerized architecture 6B00. The containerized architecture comprises a collection of interconnected components suitable for implementing embodiments of the present disclosure and/or for use in the herein-described environments. Moreover, the shown containerized architecture 6B00 includes a container instance in a configuration 651 that is further described as pertaining to the container instance 650. The configuration 651 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 650). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system and can be configured to be accessed by file system commands (e.g., "ls" or "ls-a", etc.). The container might optionally include operating system components 678, however such a separate set of operating system components need not be provided. As an alternative, a container can include a runnable instance 658, which is built (e.g., through compilation and linking, or just-in-time compilation, etc.) to include all the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 676. Such a container virtual disk controller can perform any of the functions that the aforementioned CVM virtual disk controller 626 can perform, yet such a container virtual disk controller does not rely on a hypervisor or any particular operating system to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

Embodiments as disclosed herein may be implemented in both the virtual machine architecture 6A00 or the containerized architecture 6B00.

System Architecture

Figure 7:
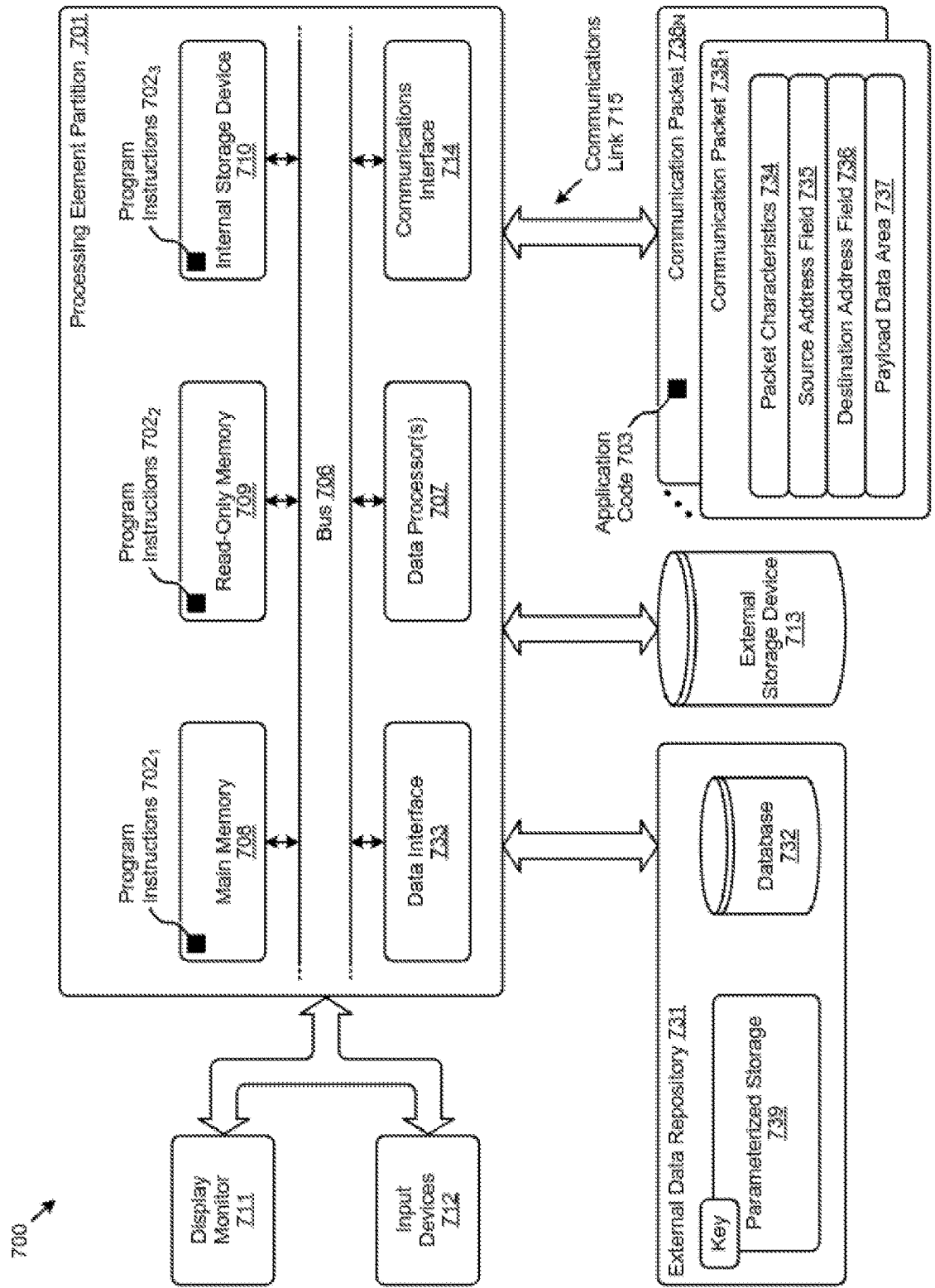
FIG. 7 is a block diagram of an illustrative computing system suitable for implementing an embodiment of the present invention.

FIG. 7 depicts a block diagram of an instance of a computer system 700 suitable for implementing embodiments of the present disclosure. Computer system 700 includes a bus 706 or other communication mechanism for communicating information. The bus interconnects subsystems and devices such as a CPU, or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 700 further comprises a display 711 (e.g., CRT or LCD), various input devices 712 (e.g., keyboard, cursor control), and an external data repository 731.

According to an embodiment of the disclosure, computer system 700 performs specific operations by data processor 707 executing one or more sequences of one or more program code instructions contained in a memory. Such instructions (e.g., program instructions 7021, program instructions 7022, program instructions 7023, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 700 performs specific networking operations using one or more instances of communications interface 714. Instances of the communications interface 714 may comprise one or more networking ports that are configurable (e.g., pertaining to speed, protocol, physical layer characteristics, media access characteristics, etc.) and any particular instance of the communications interface 714 or port thereto can be configured differently from any other particular instance. Portions of a communication protocol can be carried out in whole or in part by any instance of the communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

The communications link 715 can be configured to transmit (e.g., send, receive, signal, etc.) any types of communications packets (e.g., communications packet $738_1$, communications packet 738N) comprising any organization of data items. The data items can comprise a payload data area 737, a destination address 736 (e.g., a destination IP address), a source address 735 (e.g., a source IP address), and can include various encodings or formatting of bit fields to populate the shown packet characteristics 734. In some cases, the packet characteristics include a version identifier, a packet or payload length, a traffic class, a flow label, etc. In some cases, the payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of the computer system 700. According to certain embodiments of the disclosure, two or more instances of computer system 700 coupled by a communications link 715 (e.g., LAN, PTSN, or wireless network) may perform the sequence of instructions required to practice embodiments of the disclosure using two or more instances of components of computer system 700.

The computer system 700 may transmit and receive messages such as data and/or instructions organized into a data structure (e.g., communications packets). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 700 may communicate through a data interface 733 to a database 732 on an external data repository 731. Data items in a database can be accessed using a primary key (e.g., a relational database primary key).

The processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.).

Various implementations of the database 732 comprise storage media organized to hold a series of records or files such that individual records or files are accessed using a name or key (e.g., a primary key or a combination of keys and/or query clauses). Such files or records can be organized into one or more data structures Such files or records can be brought into and/or stored in volatile or non-volatile memory.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
   receiving a respective size estimate and a respective current hit rate for each vDisk of a plurality of vDisks, the plurality of vDisks being accessible by a controller on a computing node, and the respective size estimate for each vDisk corresponding to a given hit rate change;
   selectively controlling logging of access requests to individual vDisks of the plurality of vDisks based on at least the respective size estimates and the respective current hit rates for the plurality of vDisks to manage promotion of data to a hot storage tier from one or more of the plurality of vDisks, the hot storage tier being shared by the plurality of vDisks, the computing node controlling logging of access requests by:
      generating a respective rank for each vDisk of the plurality of vDisks based on at least the respective size estimates and the respective current hit rates for the plurality of vDisks;
      selecting a subset of the plurality of vDisks based on the respective ranks for the plurality of vDisks;
      generating an entry in a log for an access request corresponding to a selected vDisk, without generating an entry in the log for a vDisk that was not selected for the subset of the plurality of vDisks;
      analyzing the log to identify data to be promoted to the hot storage tier from the subset of the plurality of vDisks; and
      promoting the identified data to the hot storage tier.

2. The method of claim 1, wherein the identified data is promoted from a lower storage tier to the hot storage tier, the identified data is identified for promotion to the hot storage tier based on meeting or exceeding a threshold, and the threshold comprises a minimum number of accesses in a sliding time window.

3. The method of claim 1, further comprising processing an updated respective size estimate for a second vDisk of the plurality of vDisks, selecting the second vDisk, and generating an entry in the log for an access request to the second vDisk.

4. The method of claim 1, wherein generating the respective rank for each vDisk of the plurality of vDisks is further based on cluster data corresponding to a plurality of nodes, the cluster data comprising storage pool metadata.

5. The method of claim 1, further comprising processing cluster data or node data to determine a parameter for logging, wherein only access requests that satisfy the parameter are logged in the log.

6. The method of claim 1, wherein the respective size estimates comprise an estimate of an amount of storage required to be moved to the hot storage tier to cause a given hit rate increase for each vDisk of the plurality of vDisks.

7. The method of claim 1, wherein the respective size estimates comprise values normalized using an amount of space occupied by respective vDisks of the plurality of vDisks.

8. The method of claim 1, wherein the computing node is in a cluster of computing nodes and shares the hot storage tier with other nodes in the cluster of computing nodes.

9. The method of claim 1, wherein the plurality of vDisks comprises only vDisks for which a corresponding size estimate was received.

10. A non-transitory computer readable medium having stored thereon a sequence of instructions which, when executed by a processor causes a process comprising:
  receiving a respective size estimate and a respective current hit rate for each vDisk of a plurality of vDisks, the plurality of vDisks being accessible by a controller on a computing node, and the respective size estimate for each vDisk corresponding to a given hit rate change;
  selectively controlling logging of access requests to individual vDisks of the plurality of vDisks based on at least the respective size estimates and the respective current hit rates for the plurality of vDisks to manage promotion of data to a hot storage tier from one or more of the plurality of vDisks, the hot storage tier being shared by the plurality of vDisks, the computing node controlling logging of access requests by:
    generating a respective rank for each vDisk of the plurality of vDisks based on at least the respective size estimates and the respective current hit rates for the plurality of vDisks;
    selecting a subset of the plurality of vDisks based on the respective ranks for the plurality of vDisks;
    generating an entry in a log for an access request corresponding to a selected vDisk, without generating an entry in the log for a vDisk that was not selected for the subset of the plurality of vDisks;
    analyzing the log to identify data to be promoted to the hot storage tier from the subset of the plurality of vDisks; and
    promoting the identified data to the hot storage tier.

11. The computer readable medium of claim 10, wherein the identified data is promoted from a lower storage tier to the hot storage tier, the identified data is identified for promotion to the hot storage tier based on meeting or exceeding a threshold, and the threshold comprises a minimum number of accesses in a sliding time window.

12. The computer readable medium of claim 10, wherein the process further comprises processing an updated respective size estimate for a second vDisk of the plurality of vDisks, selecting the second vDisk, and generating an entry in the log for an access request to the second vDisk.

13. The computer readable medium of claim 10, wherein generating the respective rank for each vDisk of the plurality of vDisks is further based on cluster data corresponding to a plurality of nodes, the cluster data comprising storage pool metadata.

14. The computer readable medium of claim 10, wherein the process further comprises processing cluster data or node data to determine a parameter for logging, wherein only access requests that satisfy the parameter are logged in the log.

15. The computer readable medium of claim 10, wherein the plurality of vDisks comprises only vDisks for which a corresponding size estimate was received.

16. The computer readable medium of claim 10, wherein the respective size estimates comprise an estimate of an amount of storage required to be moved to the hot storage tier to cause a given hit rate increase for each vDisk of the plurality of vDisks.

17. The computer readable medium of claim 10, wherein the respective size estimates comprise values normalized using an amount of space occupied by respective vDisks of the plurality of vDisks.

18. A computing system for guiding hot-tier insertion decisions, comprising:
  a memory for storing data and instructions; and
  a processor that executes the instructions to enable actions, including:
    receiving a respective size estimate and a respective current hit rate for each vDisk of a plurality of vDisks, the plurality of vDisks being accessible by a controller on a computing node, and the respective size estimate for each vDisk corresponding to a given hit rate change;
    selectively controlling logging of access requests to individual vDisks of the plurality of vDisks based on at least the respective size estimates and the respective current hit rates for the plurality of vDisks to manage promotion of data to a hot storage tier from one or more of the plurality of vDisks, the hot storage tier being shared by the plurality of vDisks, the computing node controlling logging of access requests by:
      generating a respective rank for each vDisk of the plurality of vDisks based on at least the respective size estimates and the respective current hit rates for the plurality of vDisks;
      selecting a subset of the plurality of vDisks based on the respective ranks for the plurality of vDisks;
      generating an entry in a log for an access request corresponding to a selected vDisk, without generating an entry in the log for a vDisk that was not selected for the subset of the plurality of vDisks:
      analyzing the log to identify data to be promoted to the hot storage tier from the subset of the plurality of vDisks; and
      promoting the identified data to the hot storage tier.

19. The computing system of claim 18, wherein the identified data is promoted from a lower storage tier to the hot storage tier, the identified data is identified for promotion to the hot storage tier based on meeting or exceeding a threshold, and the threshold comprises a minimum number of accesses in a sliding time window.

20. The computing system of claim 18, further comprising processing an updated respective size estimate for a second vDisk of the plurality of vDisks, selecting the second vDisk, and generating an entry in the log for an access request to the second vDisk.

21. The computing system of claim 18, wherein generating the respective rank for each vDisk of the plurality of vDisks is further based on cluster data corresponding to a plurality of nodes, the cluster data comprising storage pool metadata.

22. The computing system of claim 18, further comprising processing cluster data or node data to determine a parameter for logging, wherein only access requests that satisfy the parameter are logged in the log.

23. The computing system of claim 18, wherein the respective size estimates comprise an estimate of an amount of storage required to be moved to the hot storage tier to cause a given hit rate increase for each vDisk of the plurality of vDisks.

24. The computing system of claim 18, wherein the respective size estimates comprise values normalized using an amount of space occupied by respective vDisks of the plurality of vDisks.

25. The computing system of claim 18, wherein the plurality of vDisks comprises only vDisks for which a corresponding size estimate was received.

\* \* \* \* \*